(12) United States Patent
Unagami et al.

(10) Patent No.: US 12,198,131 B2
(45) Date of Patent: Jan. 14, 2025

(54) CONTROL METHOD, SERVER, AND RECORDING MEDIUM

(71) Applicant: Panasonic Intellectual Property Corporation of America, Torrance, CA (US)

(72) Inventors: Yuji Unagami, Osaka (JP); Junji Michiyama, Fukuoka (JP); Junichiro Soeda, Nara (JP); Naohisa Nishida, Osaka (JP); Yuuki Hirose, Osaka (JP); Tetsuji Fuchikami, Osaka (JP); Motoji Ohmori, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 204 days.

(21) Appl. No.: 17/579,927

(22) Filed: Jan. 20, 2022

(65) Prior Publication Data
US 2022/0147984 A1 May 12, 2022

Related U.S. Application Data

(63) Continuation of application No. PCT/JP2020/028947, filed on Jul. 28, 2020.
(Continued)

(51) Int. Cl.
*G06Q 20/38* (2012.01)
(52) U.S. Cl.
CPC ......... *G06Q 20/389* (2013.01); *G06Q 20/382* (2013.01)
(58) Field of Classification Search
USPC ........................................................ 705/39
See application file for complete search history.

(56) References Cited

U.S. PATENT DOCUMENTS 10,121,025 B1* 11/2018 Rice ..................... G06F 21/645
11,341,467 B2* 5/2022 Mulye et al. ........ G06Q 20/065
(Continued)

FOREIGN PATENT DOCUMENTS

| JP | 2002-159138 | 5/2002 |
| JP | 2018-132794 | 8/2018 |
| JP | 2019-008791 | 1/2019 |

OTHER PUBLICATIONS

Blockchain @ Media, A New Game for the Media Industry, Blockchain Institute, Monitor, Deloitte, 2017. (Year: 2017).*
(Continued)

*Primary Examiner* — Scott C Anderson
*Assistant Examiner* — George N. Proios
(74) *Attorney, Agent, or Firm* — Wenderoth, Lind & Ponack, L.L.P.

(57) ABSTRACT

A control method is executed by a first server among a plurality of servers in a system including the plurality of servers and a generating device that generates record information about usage records for users belonging to one group when a service provided by a business operator is used on a group basis. The method includes: obtaining, from the generating device, first record information about a first usage record of a service by a first user belonging to the one group; determining whether the first record information obtained is permitted under a rule based on contract content, stored in the first server, of a contract entered into by the first user and the business operator; and forwarding first transaction data including a determination result to a plurality of second servers and storing a first block including the first transaction data in a distributed ledger managed by the first server.

7 Claims, 27 Drawing Sheets

Related U.S. Application Data

(60) Provisional application No. 62/881,589, filed on Aug. 1, 2019.

(56) References Cited

U.S. PATENT DOCUMENTS

| | | | |
|---|---|---|---|
| 2002/0062293 A1 | 5/2002 | Yagi et al. | |
| 2015/0382057 A1* | 12/2015 | Huang et al. | .... H04N 21/44204 |
| 2018/0365686 A1 | 12/2018 | Kondo | |
| 2022/0245602 A1* | 8/2022 | Mulye et al. | ........ G06Q 20/065 |

OTHER PUBLICATIONS

International Search Report issued Nov. 2, 2020 in International (PCT) Application No. PCT/JP2020/028947.

* cited by examiner

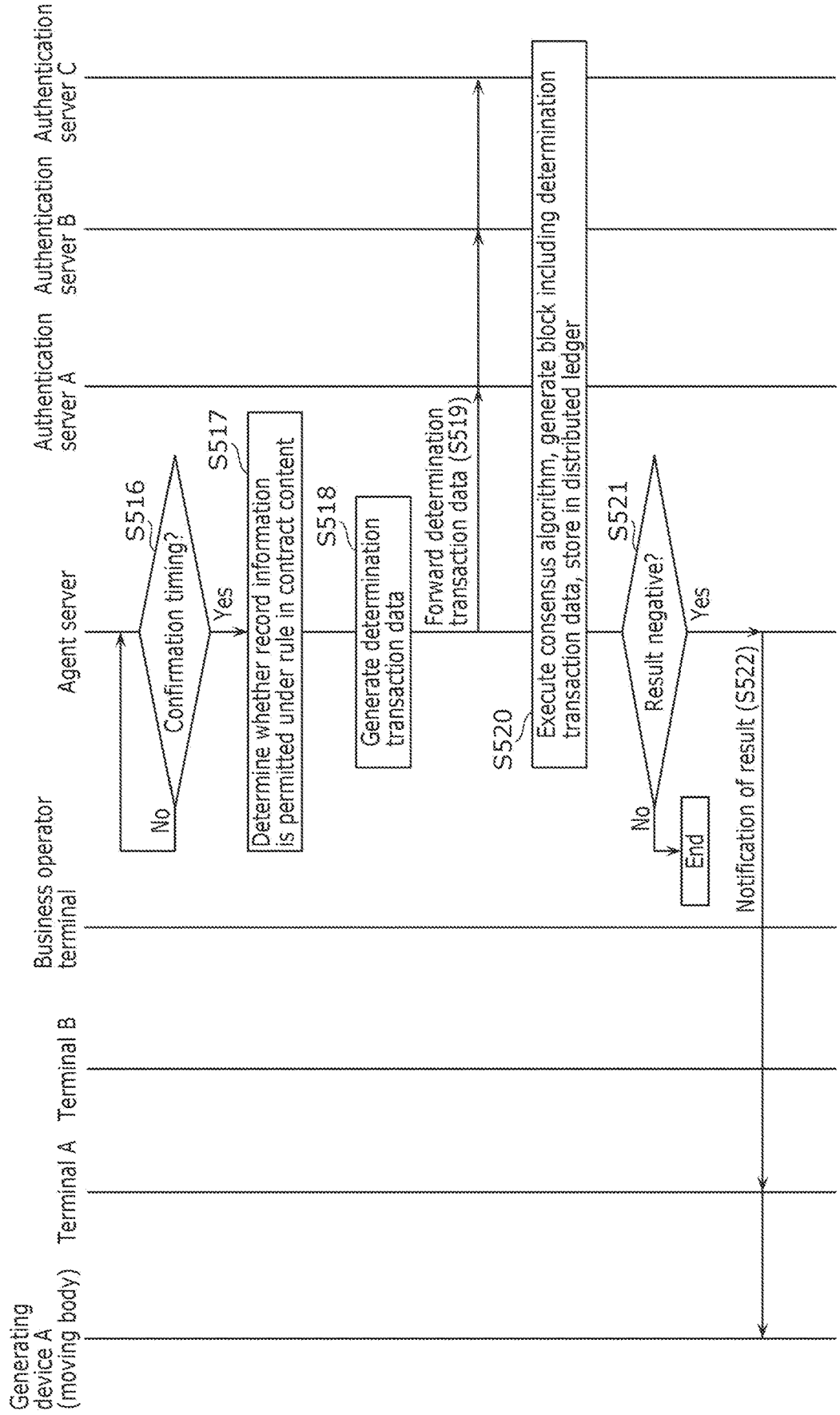

CONTROL METHOD, SERVER, AND RECORDING MEDIUM

CROSS REFERENCE TO RELATED APPLICATIONS

This is a continuation application of PCT International Application No. PCT/JP2020/028947 filed on Jul. 28, 2020, designating the United States of America, which is based on and claims priority of U.S. Provisional Patent Application No. 62/881,589 filed on Aug. 1, 2019. The entire disclosures of the above-identified applications, including the specifications, drawings and claims are incorporated herein by reference in their entirety.

FIELD

The present disclosure relates to a control method, a server, and a recording medium.

BACKGROUND

For example, PTL 1 discloses a method in which a necessary maximum current capacity used by each of users is found and a contracted current is determined according to the maximum current capacity found.

CITATION LIST

Patent Literature

PTL 1: Japanese Unexamined Patent Application Publication No. 2002-159138

SUMMARY

Technical Problem

However, in the method disclosed in PTL 1, each user enters into an individual contract with a business operator such as an electric power company, and there is thus a problem in that it is not possible to suppress situations where the business operator and a user collude to enter into a contract with contract content that is not fair to other users.

For example, in a housing complex such as an apartment building, a user in each unit and the electric power company enter into individual contracts. In this case, the electric power company and one user may collude and enter into a contract with preferential contract content compared to other users, such as having the amount of power allocated to only the user's residence increased, the fee per kilowatt reduced, or the like. Here, even if the contract content for each unit in a housing complex are managed so as to be visible to the entire housing complex, it is not possible to guarantee that users of each unit will actively go to view the contract terms of other users to confirm that the contracts are fair. In other words, when a business operator and users enter into individual contracts, it is not possible to suppress situations where the electric power company and one user collude to create preferential contract content.

Additionally, for example, in a car sharing service including automobiles, each user and the service provider business enter into an individual contract. In this case too, the service provider business and a user may collude to enter into a contract with preferential contract content compared to other users, such as increasing the share time of the user while charging that user the same fee as the other users. As above, in such a case, even if the contract content for each user is managed so as to be visible to all the users, it is not possible to guarantee that users will actively go to view the contract content of other users to confirm that the contracts are fair. In other words, when a service provider business and users enter into individual contracts, it is not possible to suppress situations where the service provider business and one user collude to create preferential contract content.

Having been achieved in light of the foregoing situation, an object of the present disclosure is to provide a control method, a server, and a program that enable newly-formed contracts to be audited more reliably.

Solution to Problem

A control method according to one aspect of the present disclosure is a control method executed by a first server among a plurality of servers in a system. The system includes the plurality of servers and a generating device that generates record information pertaining to a usage record for each of users belonging to one group when a service provided by a business operator is used on a group basis. The control method includes: obtaining, from the generating device, first record information pertaining to a first usage record by a first user belonging to the one group; determining whether or not the first record information obtained is permitted under a rule based on contract content of a contract entered into by the first user and the business operator, the contract content being stored in the first server; and forwarding first transaction data including a determination result from the determining to a plurality of second servers different from the first server among the plurality of servers and storing a first block including the first transaction data in a distributed ledger managed by the first server.

Note that these comprehensive or specific aspects may be realized by a system, a method, an integrated circuit, a computer program, or a computer-readable recording medium such as a CD-ROM, or may be implemented by any desired combination of systems, methods, integrated circuits, computer programs, and recording media.

Advantageous Effects

According to the present disclosure, newly-formed contracts can be audited more reliably.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 30 is a sequence chart illustrating auditing processing by the management system according to Variation 2 on Embodiment 3.

DESCRIPTION OF EMBODIMENTS

Figure 1:
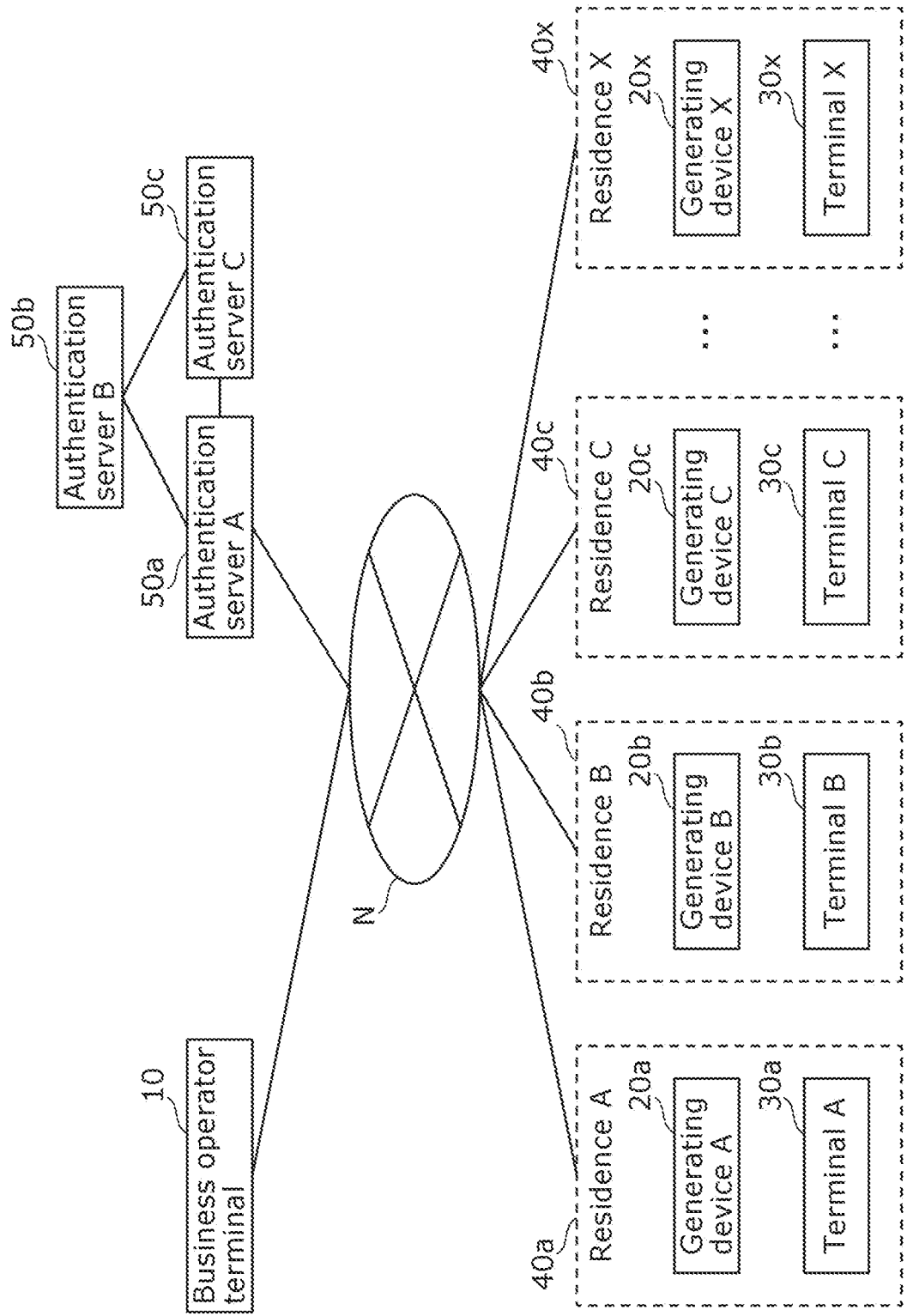
FIG. 1 is a diagram illustrating an example of the configuration of a management system according to Embodiment 1.

A control method according to one aspect of the present disclosure is a control method executed by a first server among a plurality of servers in a system. The system includes the plurality of servers and a generating device that generates record information pertaining to a usage record for each of users belonging to one group when a service provided by a business operator is used on a group basis. The control method includes: obtaining, from the generating device, first record information pertaining to a first usage record by a first user belonging to the one group; determining whether or not the first record information obtained is permitted under a rule based on contract content of a contract entered into by the first user and the business operator, the contract content being stored in the first server; and forwarding first transaction data including a determination result from the determining to a plurality of second servers different from the first server among the plurality of servers and storing a first block including the first transaction data in a distributed ledger managed by the first server.

Through this, whether or not the first record information is permitted under a rule in the contract content of the contract entered into by the business operator and the first user can be determined.

Additionally, for example, the control method may further include determining whether or not a first timing has arrived, and when the first timing is determined to have arrived, determining whether or not the first record information is permitted under the rule.

This makes it possible to suppress the number of times the determination is made.

Additionally, for example, the control method may further include: transmitting the contract content and the first record information to a terminal of a second user different from the first user and belonging to the one group when the determination result indicates that the first record information is not permitted under the rule; obtaining, from the terminal, a confirmation result by the second user regarding the contract content and the first record information; and forwarding the confirmation result obtained to the plurality of second servers and storing a second block including the confirmation result in the distributed ledger.

Accordingly, the contract content and the record information to be confirmed by the second user can be narrowed down to the contract content and the first record information of the first user for which the first record information may not be permitted under the rule. This makes it possible to suppress the amount of information in the contract content and the record information communicated to the second user, which makes it possible to reduce the communication amount.

Additionally, for example, the control method may further include: forwarding the first record information obtained to the plurality of second servers and storing a third block including the first record information in the distributed ledger.

Through this, the determination result is stored in the distributed ledger, and thus the determination result can be prevented from being tampered with at a later date.

Additionally, for example, the control method may further include: when storing the first block in the distributed ledger, executing, along with the plurality of second servers, a consensus algorithm for agreeing on a validity of transaction data including the first transaction data; and storing a block including the transaction data in the distributed ledger when the validity of the transaction data has been agreed on through the consensus algorithm.

Additionally, for example, the system may further include a plurality of terminals each used by a corresponding one of the users, each of the plurality of terminals may have the distributed ledger, and the control method may further include, when storing a block including the first transaction data in the distributed ledger: executing, along with the plurality of terminals, a consensus algorithm for agreeing on a validity of transaction data including the first transaction data; and storing a block including the transaction data in the distributed ledger when the validity of the transaction data has been agreed on through the consensus algorithm.

Additionally, for example, the control method may further include: when storing a block including the transaction data in the distributed ledger, storing the transaction data in the distributed ledger as blockchain transaction data.

Additionally, for example, the first record information may include a usage amount of the service by the first user or a record value that increases as a usage time increases, and under the rule, the first record information may not be permitted to exceed a threshold included in the contract content.

A server according to one aspect of the present disclosure is a server among a plurality of servers in a system. The system includes the plurality of servers and a generating device that generates record information pertaining to a usage record for each of users belonging to one group when a service provided by a business operator is used on a group basis. The server includes a processor and memory. The processor: obtains, from the generating device, first record information pertaining to a first usage record by a first user belonging to the one group; determines whether or not the first record information obtained is permitted under a rule based on contract content of a contract entered into by the first user and the business operator, the contract content being stored in the server; and forwards first transaction data including a determination result from the determining to a plurality of other servers different from the server among the plurality of servers and stores a first block including the first transaction data in a distributed ledger managed by the server.

A recording medium according to one aspect of the present disclosure is a non-transitory computer-readable recording medium storing a program for causing a computer to execute a control method executed by a first server among a plurality of servers in a system. The system including the plurality of servers and a generating device that generates record information pertaining to a usage record for each of users belonging to one group when a service provided by a business operator is used on a group basis. The control method includes: obtaining, from the generating device, first record information pertaining to a first usage record by a first user belonging to the one group; determining whether or not the first record information obtained is permitted under a rule based on contract content of a contract entered into by the first user and the business operator, the contract content being stored in the first server; and forwarding first transaction data including a determination result from the determining to a plurality of second servers different from the first server among the plurality of servers and storing a first block including the first transaction data in a distributed ledger managed by the first server.

Embodiments will be described hereinafter with reference to the Drawings. Note that the following embodiments describe specific examples of the present disclosure. In other words, the numerical values, shapes, materials, constituent elements, arrangements and connection states of constituent elements, steps, orders of steps, and the like in the following embodiments are merely examples, and are not intended to limit the present disclosure. Additionally, of the constituent elements in the following embodiments, constituent elements not denoted in the independent claims indicating the broadest interpretation are not absolutely necessary for solving the problem of the present disclosure, and will instead be described as constituent elements constituting more preferred forms.

Embodiment 1

The configuration of a system according to the present disclosure will be described first.

A management system according to the present disclosure includes three or more terminals, each used by a user, and one or more authentication servers. The management system causes a contract document, i.e., the contract content, of a newly-formed contract to be audited, and based on an audit result, stores the validated contract in a ledger. The configuration and the like of the management system according to the present embodiment will be described hereinafter with reference to the drawings.

Management System

FIG. 1 is a diagram illustrating an example of the configuration of a management system according to Embodiment 1.

As illustrated in FIG. 1, the management system according to the present embodiment includes, for example, business operator terminal 10, generating devices 20a to 20x, terminals 30a to 30x, and authentication servers 50a to 50c. These are connected over network N. Network N is, for example, the Internet, a cellular telephone carrier network, or the like, but may be constituted by any communication line or network. One of generating devices 20a to 20x and one of terminals 30a to 30x are associated with one of residences 40a to 40x. For example, generating device 20a and terminal 30a are associated with residence 40a of user A.

Although each of generating device 20a to generating device 20x will also be called "generating device 20" hereinafter, generating device 20a to generating device 20x may also be referred to as "generating device A" to "generating device X". Likewise, although each of terminal 30a to terminal 30x will also be called "terminal 30" hereinafter, terminal 30a to terminal 30x may also be referred to as "terminal A" to "terminal X".

Business operator terminal 10 will be described hereinafter.

Business Operator Terminal 10

Business operator terminal 10 is an example of a terminal used by a business. The business operator provides a service that can be used on a group basis. The group includes a plurality of users. The business operator enters into contracts for the service to be provided individually with each of the plurality of users in the group, and provides the service according to the contracts entered into. For example, the business operator provides a quantity of a service according to the contract entered into. Note that the business operator that provides the service is an example of a user of the management system, and the user that receives the service from the business operator is an example of a user of the management system.

In the present embodiment, business operator terminal 10 is a terminal used by a business. Business operator terminal 10 may be a personal computer, for example, or may be a mobile terminal such as a smartphone, a tablet, or the like. Note that the business operator may be, for example, a person who runs a business such as a power company, a communication business, a sharing service provider, or the like, or may be an employee of the same. A contract entered into between the business operator and the user is, for example, an individual contract.

In the present embodiment, the group common to the plurality of users is, for example, a housing complex including residences 40a to 40x in which the plurality of users reside, respectively. For example, in the case where a business provided by a business partner is a power company, a plurality of users belonging to a common group receive power from a common power receiving business operator. In this case, the business operator is a management company of the housing complex including the residences where the plurality of users live.

Figure 2:
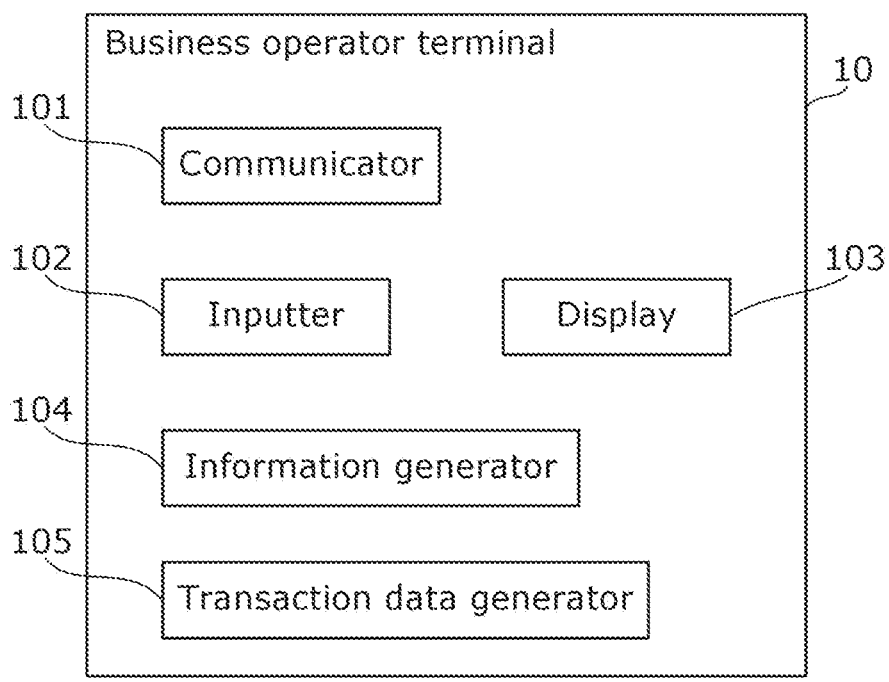
FIG. 2 is a diagram illustrating an example of the configuration of a business operator terminal according to Embodiment 1.

FIG. 2 is a diagram illustrating an example of the configuration of business operator terminal 10 according to Embodiment 1.

Business operator terminal 10 according to the present embodiment includes communicator 101, inputter 102, display 103, information generator 104, and transaction data generator 105.

Communicator 101

Communicator 101 transmits, to authentication server 50, contract transaction data containing contract information including contract content of a contract between the business operator and a user, and a digital signature of the user.

In the present embodiment, communicator 101 transmits information to authentication server 50, receives notifications from authentication server 50, and the like over network N. Communicator 101 also transmits information to terminal 30, receives information from terminal 30, and the like over network N.

In this manner, communicator 101 communicates with terminals 30a to 30x or authentication server 50 over network N. Note that this communication may be performed using Transport Layer Security (TLS), and communicator 101 may hold an encryption key for TLS communication.

Inputter 102

Inputter 102 accepts information input through operations made by the business operator. Inputter 102 displays the accepted information input in display 103, transmits the accepted information input to information generator 104 or communicator 101, and the like.

In the present embodiment, inputter 102 accepts items related to a contract document agreed upon with user A and a digital signature of the business operator, which are input through operations made by the business operator. This contract document is an example of a contract made between a business operator and a user, and is data including the contract content of that contract. Inputter 102 transmits, to information generator 104, the items and the digital signature of the business operator which have been accepted. Additionally, inputter 102 accepts confirmation of a notification displayed in display 103, through operations made by the business operator.

Display 103

Display 103 displays the information input accepted by inputter 102. Display 103 displays information communicated from authentication server 50.

Information Generator 104

Information generator 104 generates first information pertaining to the contract.

In the present embodiment, based on the items pertaining to the contract document agreed upon with user A and the digital signature of the business operator, which are accepted by inputter 102, information generator 104 generates contract information pertaining to this contract document. This user A is an example of a user who receives provision of a service from the business operator, i.e., a user.

Here, the contract information includes the data of the contract document, time information, a contractor ID, and a digital signature of the generator of the contract information. The contract information may further include a serial number for ascertaining the order in which the contract was entered into. The data of the contract document is data indicating the contract content of the contract, and may be data in which the contract content of the contract document is encrypted, or a hash value for identifying the contract content of the contract document. The time information may indicate the time at which the contract information was generated, or may indicate the time at which the contract was entered into. Additionally, the time information may indicate the time at which the contract information was transmitted to authentication server 50 by communicator 101. Note that the generator of the contract information mentioned here is the business operator. The contractor ID is an ID of the user who agreed upon the contract with the business operator, i.e., user A.

Transaction Data Generator 105

Transaction data generator 105 generates the contract transaction data.

In the present embodiment, transaction data generator 105 generates contract transaction data including the contract information received from terminal 30.

Here, the contract transaction data including the contract information includes the data of the contract document, time information, a contractor ID, and a digital signature of the generator of the contract information. The contract transaction data including the contract information may further include a serial number for ascertaining the order in which the contract was entered into.

Transaction data generator 105 transmits the generated contract transaction data to authentication server 50 via communicator 101.

Note that business operator terminal 10 need not include transaction data generator 105. If business operator terminal 10 does not include transaction data generator 105, information generator 104 transmits the generated contract information to authentication server 50 via communicator 101. This enables authentication server 50 to obtain the contract information from business operator terminal 10.

Generating device 20a to generating device 20x will be described next. Note that generating device 20a to generating device 20x have the same configuration, and will therefore be referred to as "generating device 20".

Generating Device 20

Generating device 20 is an example of a device that generates record information pertaining to a usage record of the service for each user. One of generating devices 20 is a device used by a first user among a plurality of users who have agreed to contracts with the business operator. Additionally, one of generating devices 20 is a device used by a second user who is different from the first user, among the plurality of users who have agreed to contracts with the business operator.

For example, when the business operator runs a power company, generating device 20 is a smart meter. For example, when the business operator runs a moving body sharing business, generating device 20 is a moving body. In this case, the moving body may, for example, be a vehicle such as an automobile or a bicycle, a ship, an aircraft, or the like. For example, when the business operator runs a mobile communication business, generating device 20 may be a mobile terminal such as a smartphone or a tablet, and in this case, generating device 20 may be terminal 30.

In the present embodiment, it is assumed that of the plurality of generating devices 20, generating device 20a, i.e., generating device A, is a device used by the first user. Additionally, it is assumed that of the plurality of generating devices 20, generating device 20b, i.e., generating device B, is a device used by the second user. Note that, for example, the second user is a user who belongs to the same group as the first user, and who receives the provision of the same service from the business operator along with the first user. The second user has agreed to a contract with the business operator separate from the first user. In other words, the contract entered into between the business operator and the first user is different from the contract entered into between the business operator and the second user.

Figure 3:
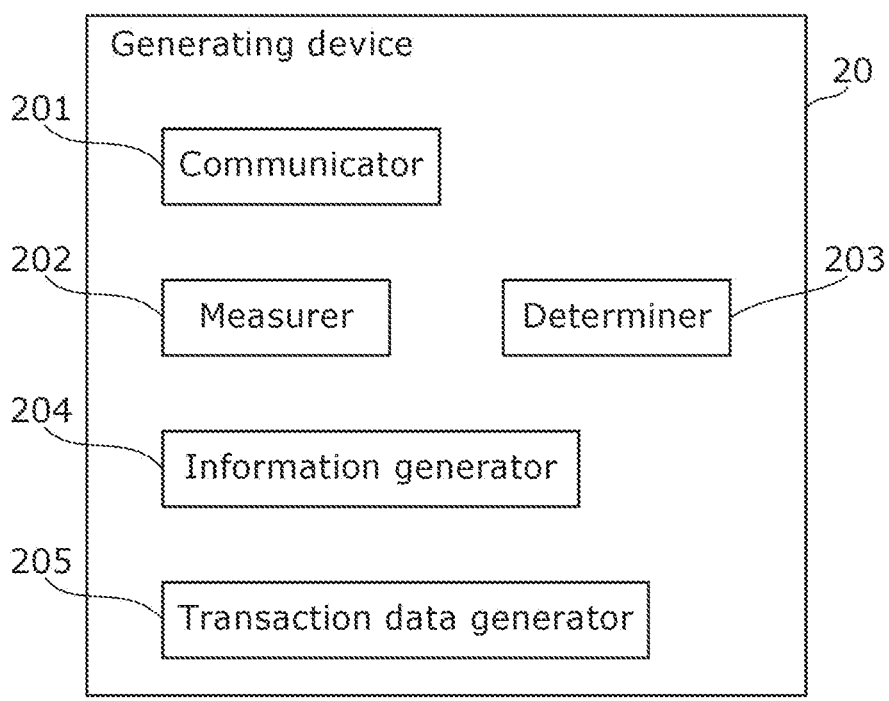
FIG. 3 is a diagram illustrating an example of the configuration of a generating device according to Embodiment 1.

FIG. 3 is a diagram illustrating an example of the configuration of generating device 20 according to Embodiment 1.

Generating device 20 according to the present embodiment includes communicator 201, measurer 202, determiner 203, information generator 204, and transaction data generator 205.

Communicator 201

Communicator 201 transmits information to authentication server 50 over network N. Additionally, communicator 201 may receive or be notified of information from authentication server 50. Communicator 201 may transmit information to business operator terminal 10, and may receive information from business operator terminal 10, over network N.

In this manner, communicator 201 communicates with business operator terminal 10 or authentication server 50 over network N. Note that this communication may be performed using Transport Layer Security (TLS), and communicator 201 may hold an encryption key for TLS communication.

For example, when generating device 20 is generating device A, communicator 201 receives the first information from authentication server 50. Communicator 201 transmits, to business operator terminal 10, second information, in which a confirmation result indicating whether the second user consents or does not consent to a first contract and the digital signature of the second user is added to the first information.

Measurer 202

Measurer 202 measures the usage record of the user for the service provided by the business operator. For example, when the service provided by the business operator is electric power, measurer 202 measures the amount of electric power used by the user. The amount of electric power used is, for example, a consumed power amount consumed by residence 40 of the user. For example, when the service provided by the business operator is mobile communication, measurer 202 measures the amount of communication used by the user. The amount of communication used is, for example, a communication data amount used for communication by terminal 30 of the user. For example, when the service provided by the business operator is a moving body sharing service, measurer 202 measures the amount of use of the moving body by the user. The amount of use of the moving body is at least one of, for example, a travel distance of the moving body, a travel time, fuel consumption, or a consumed power amount. Measurer 202 transmits a measurement result, i.e., the usage record of the user as measured, to information generator 204, to communicator 201, or the like Determiner 203

Determiner 203 determines whether or not a predetermined timing has arrived. For example, determiner 203 may determine that the predetermined timing has arrived in response to a first period elapsing after the start of the measurement by measurer 202, or may determine that the predetermined timing has arrived in response to the first period elapsing after the previous determination that the predetermined timing has arrived. The first period may be, for example, 12 hours, one day, one week, one month, or the like. Determiner 203 notifies communicator 201 or information generator 204 that the predetermined timing has arrived.

Information Generator 204

Information generator 204 generates first record information including a first usage record of the first user in the first period obtained from measurement by measurer 202 in the first period and the digital signature of the first user. Information generator 204 generates the first record information based on the usage amount of the service measured by measurer 202 when determiner 203 determines that the predetermined timing has arrived. When measurer 202 measures a total usage amount after the start of use of the service by the first user, information generator 204 calculates the first usage record by the first user in the first period between the previous timing and the current timing by subtracting the total usage amount that was the basis for generating the first record information at the previous timing from the total usage amount measured by measurer 202 at the current timing. When measurer 202 measures the first usage record by the first user from the previous timing, information generator 204 obtains the usage amount measured by measurer 202 at the current timing as the first usage record of the first user in the first period between the previous timing and the current timing. The first record information may include the time at which the first usage record was measured. Note that the first record information may also be referred to simply as "record information".

Transaction Data Generator 205

Transaction data generator 205 generates record transaction data.

In the present embodiment, transaction data generator 205 generates the record transaction data including the first record information generated by information generator 204.

Here, the record transaction data including the first record information includes the first record information, the time information, and the digital signature of the first user. The time information is information indicating the time when the first record information was generated.

Transaction data generator 205 transmits the generated record transaction data to authentication server 50 via communicator 201.

Note that generating device 20 need not include transaction data generator 205. If generating device 20 does not include transaction data generator 205, information generator 204 transmits the generated first record information to authentication server 50 via communicator 201. This enables authentication server 50 to obtain the first record information from generating device 20.

Note that generating device 20 may be configured to include at least measurer 202, and may be configured so as not to include processing units aside from measurer 202. In this case, a device separate from generating device 20 may include communicator 201, determiner 203, information generator 204, and transaction data generator 205. This separate device is communicably connected to generating device 20. In the separate device, the measurement result from measurer 202 is obtained from generating device 20 by communicator 201. Next, using the obtained measurement result, information generator 204 generates the first record information pertaining to the first usage record in the first period up to the timing determined by determiner 203. Next, transaction data generator 205 generates the record transaction data including the first record information, and transmits the record transaction data to authentication server 50 via communicator 201. Generating device 20 and the separate device are in a one-to-one relationship, for example. The processing units included in the separate device may be provided in terminal 30 (described below).

Terminal 30a to terminal 30x will be described next. Note that terminal 30a to terminal 30x have the same configuration, and will therefore be referred to as "terminal 30".

Terminal 30

Terminal 30 is an example of a terminal used by a user. Terminal 30 may be a personal computer, for example, or may be a mobile terminal such as a smartphone, a tablet, or the like. One of terminals 30 is a terminal used by the first user among a plurality of users who have agreed to contracts with the business operator. Additionally, one of terminals 30 is a terminal used by the second user who is different from the first user, among the plurality of users who have agreed to contracts with the business operator.

In the present embodiment, it is assumed that of the plurality of terminals 30, terminal 30a, i.e., terminal A, is a terminal used by the first user. Additionally, it is assumed that of the plurality of terminals 30, terminal 30b, i.e., terminal B, is a terminal used by the second user.

Figure 4:
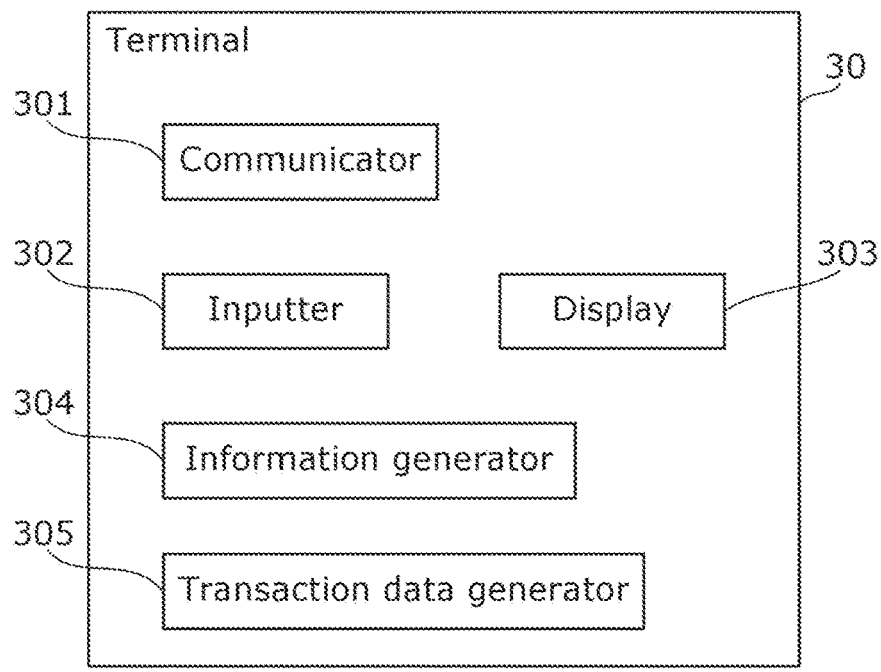
FIG. 4 is a diagram illustrating an example of the configuration of a terminal according to Embodiment 1.

FIG. 4 is a diagram illustrating an example of the configuration of terminal 30 according to Embodiment 1.

Terminal 30 according to the present embodiment includes communicator 301, inputter 302, display 303, information generator 304, and transaction data generator 305.

Communicator 301

Communicator 301 transmits information to authentication server 50, receives information or notifications from authentication server 50, and the like over network N. Communicator 301 also transmits information to business operator terminal 10, receives information from business operator terminal 10, and the like over network N.

In this manner, communicator 301 communicates with business operator terminal 10 or authentication server 50 over network N. Note that this communication may be performed using Transport Layer Security (TLS), and communicator 301 may hold an encryption key for TLS communication.

For example, when terminal 30 is terminal A, communicator 301 receives a confirmation result (described later) from authentication server 50. Additionally, for example, when terminal 30 is terminal B, communicator 301 receives, from authentication server 50, the contract content of the contract entered into by the business operator and the first user, and the first record information pertaining to the first usage record of the first user in the first period.

Inputter 302

Inputter 302 accepts information input through operations made by the user. Inputter 302 displays the accepted information input in display 303, transmits the accepted information input to information generator 304 or communicator 301, and the like.

For example, when terminal 30 is terminal B, inputter 302 accepts, as the confirmation result of the second user, an input to a display (user interface; UI) for confirming with the second user whether or not the first record information is permitted under a rule in the contract content of the contract entered into by the business operator and the first user. This display (UI) is displayed in display 303. Inputter 302 may accept the digital signature of the second user. Inputter 302 transmits, to information generator 304, the confirmation result and the digital signature which have been accepted.

Display 303

Display 303 displays the information input accepted by inputter 302. Display 303 displays information transmitted from authentication server 50.

For example, when terminal 30 is terminal B, display 303 displays the display (user interface; UI) for confirming with the second user whether or not the first record information is permitted under a rule in the contract content of the contract entered into by the business operator and the first user, based on the contract content and the first record information transmitted from authentication server 50.

Information Generator 304

Information generator 304 generates confirmation information including a confirmation result from the second user as to whether or not the first record information is permitted under a rule in the contract content of the contract entered into by the business operator and the first user, and the digital signature of the second user.

Transaction Data Generator 305

Transaction data generator 305 generates confirmation transaction data.

In the present embodiment, transaction data generator 305 generates the confirmation transaction data including the confirmation information generated by information generator 304.

Here, the confirmation transaction data including the confirmation information includes the confirmation information, time information, and the digital signature of the second user. The time information is information indicating the time when the confirmation information was generated. Note that instead of the time information, the confirmation transaction data may include information for specifying the first usage record subject to the confirmation by the confirmation information. The "information for specifying the first usage record" may be the time when the first record information of the first usage record was generated, an ID or serial number for specifying the first record information of the first usage record, or the like.

Transaction data generator 305 transmits the generated confirmation transaction data to authentication server 50 via communicator 301.

Authentication server 50 will be described next.

Authentication Server 50

Authentication server 50 is an example of a first server.

Figure 5:
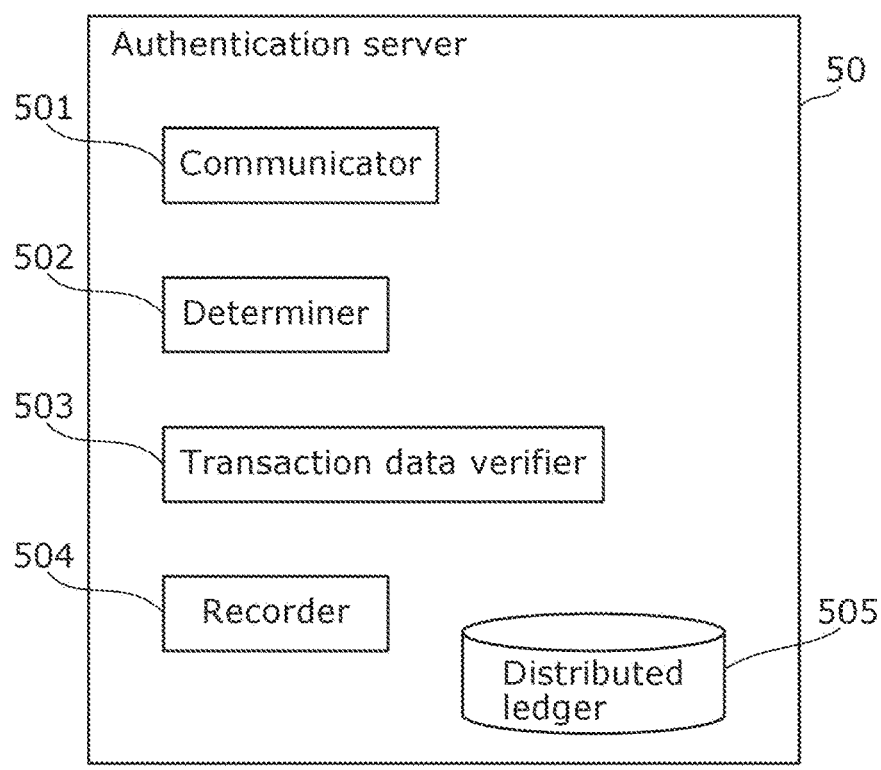
FIG. 5 is a diagram illustrating an example of the configuration of an authentication server according to Embodiment 1.

FIG. 5 is a diagram illustrating an example of the configuration of authentication server 50 according to Embodiment 1.

As illustrated in FIG. 5, authentication server 50 includes communicator 501, determiner 502, transaction data verifier 503, recorder 504, and distributed ledger 505. Authentication server 50 can be implemented by a processor executing a predetermined program using memory. Each constituent element will be described hereinafter.

Communicator 501

Communicator 501 receives the contract transaction data, including the contract information, from business operator terminal 10. Communicator 501 obtains the contract information by receiving the contract transaction data from business operator terminal 10. Communicator 501 may receive the contract information directly from business operator terminal 10.

Additionally, communicator 501 receives the record transaction data, including the first record information, from generating device 20. Communicator 501 obtains the first record information by receiving the record transaction data from generating device 20. Communicator 501 may receive the first record information directly from generating device 20.

Additionally, communicator 501 may transmit the contract information and the record information of the first user to terminal 30b of the second user. In this case, communicator 501 receives the confirmation transaction data, including the confirmation information of the confirmation result, from terminal 30b of the second user. Communicator 501 obtains the confirmation information by receiving the confirmation transaction data from terminal 30b. Communicator 501 may receive the confirmation information directly from terminal 30b.

Additionally, communicator 501 transmits, to business operator terminal 10 or terminal 30a of the first user, a result indicating whether or not the first record information is permitted under a rule in the contract content of the contract entered into by the business operator and the first user (an audit result). The audit result includes information indicating that the first record information is permitted under a rule in the contract content of the contract entered into by the business operator and the first user, or that the first record information is not permitted under a rule in the contract content of the contract entered into by the business operator and the first user.

Additionally, communicator 501 exchanges each type of transaction data with another authentication server 50. Specifically, communicator 501 forwards each type of transaction data to the other authentication server 50, receives each type of transaction data forwarded from the other authentication server 50, and the like. Note that "each type of transaction data" includes one of the contract transaction data, the record transaction data, determination transaction data, and the confirmation transaction data.

In this manner, communicator 501 communicates with business operator terminal 10, generating device 20, or terminal 30 over network N. Note that this communication may be performed using Transport Layer Security (TLS), and communicator 501 may hold an encryption key for TLS communication.

Determiner 502

Determiner 502 determines whether or not the first record information is permitted under a rule in the contract content of the contract entered into by the business operator and the first user. Under the rule in the contract content, the first record information is not permitted to exceed a threshold included in the contract content. In other words, this rule sets an upper limit on the usage amount of the service used by a user in the first period, for example. Note that the first record information includes the usage amount of the service by the user, or a record value that increases as usage time of the service increases. For example, when the service provided by the business operator is electric power, this record value is the amount of electric power used by the user. The amount of electric power used is, for example, a consumed power amount consumed by residence 40 of the user. Additionally, for example, when the service provided by the business operator is mobile communication, the record value is the amount of communication used by the user. The amount of communication used is, for example, a communication data amount used for communication by terminal 30 of the user. Additionally, when the service provided by the business operator is a moving body sharing service, the record value is the amount of use of the moving body by the user. The amount of use of the moving body is at least one of, for example, a travel distance of the moving body, a travel time, fuel consumption, or a consumed power amount.

For example, when the usage amount of the service used by the user in the first period exceeds the upper limit set by the rule in the contract content, determiner 502 determines that the first record information is not permitted under the rule in the contract content of the contract entered into by the business operator and the first user. When the usage amount of the service used by the user in the first period does not exceed the upper limit set by the rule in the contract content, determiner 502 determines that the first record information is permitted under the rule in the contract content of the contract entered into by the business operator and the first user.

Determiner 502 determines whether or not a confirmation timing has arrived, and if the confirmation timing has arrived, determines whether or not the first record information is permitted. Specifically, the confirmation timing may be a predetermined timing, such as a timing when a usage fee for the service is charged to the user, a timing written in the contract document, or the like. Additionally, the confirmation timing may be the timing at which the usage amount of the service used exceeds a predetermined usage amount after the previous confirmation timing was determined to have arrived. The predetermined usage amount may be greater than the usage amount of the service by the first user in the first period. Additionally, the confirmation timing may be determined to have arrived when a second period has elapsed after the previous confirmation timing was determined to have arrived. The second period may be longer than the first period, or may be the same as the first period. If the first period and the second period are the same, determiner 502 may determine that the confirmation timing has arrived by obtaining the first record information from generating device 20. The second period may be, for example, 12 hours, one day, one week, one month, or the like. Determiner 502 notifies communicator 501 that the confirmation timing has arrived. Note that the confirmation timing is an example of a first timing.

If it is determined that the first record information is not permitted under the rule in the contract content of the contract entered into by the business operator and the first user, i.e., if the result of this determination indicates that the first record information is not permitted under this rule, determiner 502 may transmit the contract content and the first record information to terminal 30 of the second user, who is different from the first user and who belongs to the same group as the first user. Specifically, if it is determined that the first record information is not permitted under the rule in the contract content of the contract entered into by the business operator and the first user, determiner 502 transmits, to terminal 30b of user B, the contract content of the first user and the usage amount of the service by the first user in the first period. Through this, the user B can perform an audit based on the contract content of user A and the first record information using terminal 30b.

Determiner 502 generates the determination transaction data, which includes a result of the determination as to whether or not the first record information is permitted under a rule in the contract content of the contract entered into by the business operator and the first user. Determiner 502 forwards the generated determination transaction data to communicator 501.

Transaction Data Verifier 503

When communicator 501 receives transaction data, transaction data verifier 503 verifies the validity of the transaction data. For example, transaction data verifier 503 verifies whether the transaction data received by communicator 501 has been given a digital signature generated by a correct method. Note that this verification may be skipped. Here, the transaction data received by communicator 501 is one of the contract transaction data, the record transaction data, the determination transaction data, or the confirmation transaction data.

Additionally, transaction data verifier 503, along with other authentication servers 50, executes a consensus algorithm for agreeing on the validity of the transaction data.

Here, Practical Byzantine Fault Tolerance (PBFT) may be used as the consensus algorithm, or another publicly-known consensus algorithm may be used. For example, Proof of Work (PoW), Proof of Stake (PoS), or the like can be given as publicly-known consensus algorithms. When PBFT is used as the consensus algorithm, transaction data verifier 503 receives reports from the other authentication servers 50 indicating whether or not the verification of the transaction data has succeeded, and determines whether or not the number of the reports exceeds a predetermined number. When the number of the reports exceeds the predetermined number, transaction data verifier 503 may determine that the validity of the transaction data has been verified by the consensus algorithm.

When the validity of the transaction data has been verified, transaction data verifier 503 causes recorder 504 to record that transaction data.

In the present embodiment, transaction data verifier 503 verifies the validity of the contract transaction data, the record transaction data, the determination transaction data, and the confirmation transaction data received by communicator 501.

Recorder 504

By including the transaction data for which the validity has been verified by transaction data verifier 503 in blocks and recording the blocks into distributed ledger 505, recorder 504 records the transaction data.

Note that distributed ledger 505 may be configured within recorder 504.

Distributed Ledger 505

Distributed ledger 505 stores the contract transaction data including the contract information, the record transaction data including the record information, the determination transaction data including the determination result, and the confirmation transaction data including the confirmation information.

Operations, Etc. Of Management System

Operations of the management system configured as described above will be described next.

Figure 6:
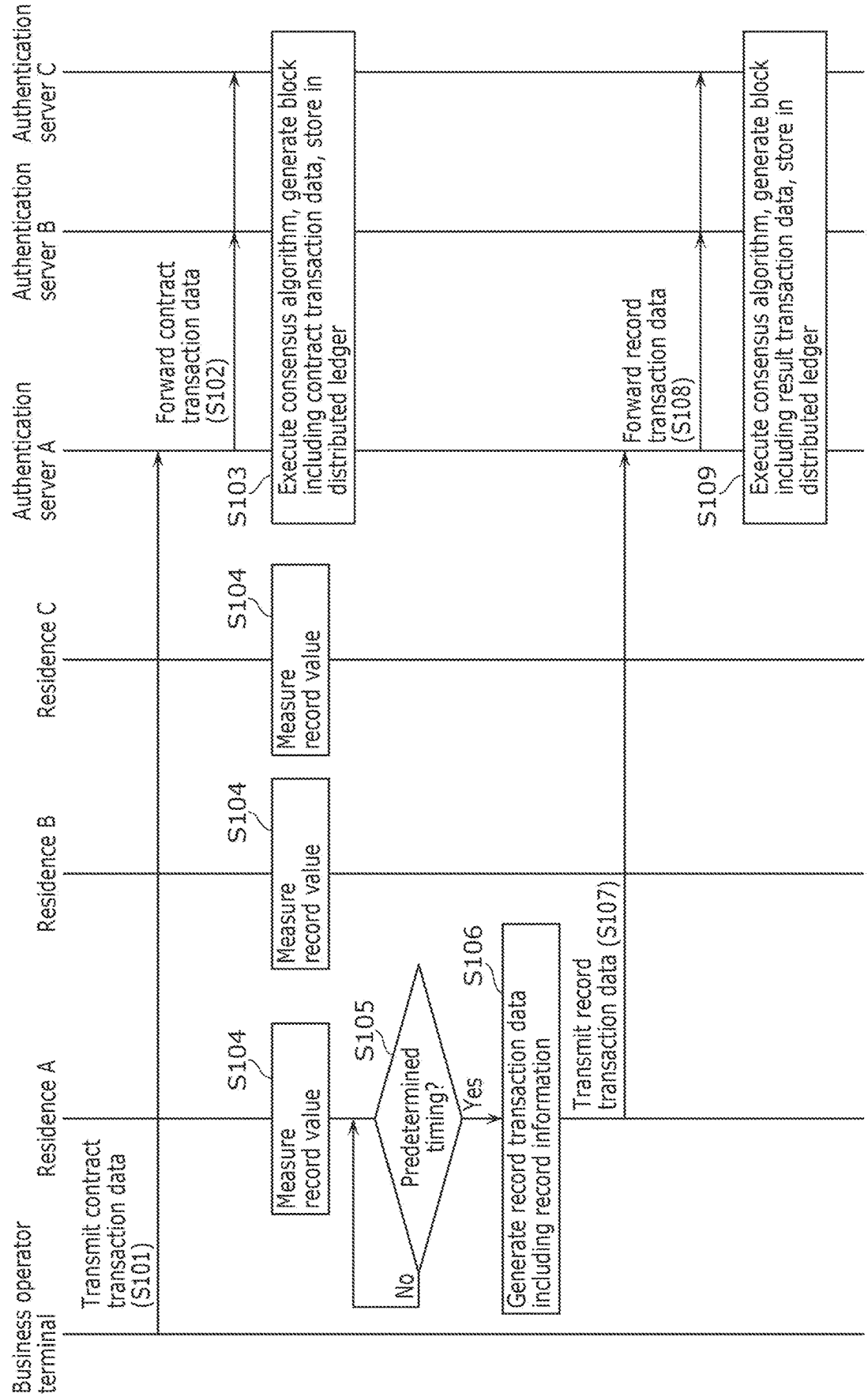
FIG. 6 is a sequence chart illustrating auditing processing by the management system according to Embodiment 1.
Figure 7:
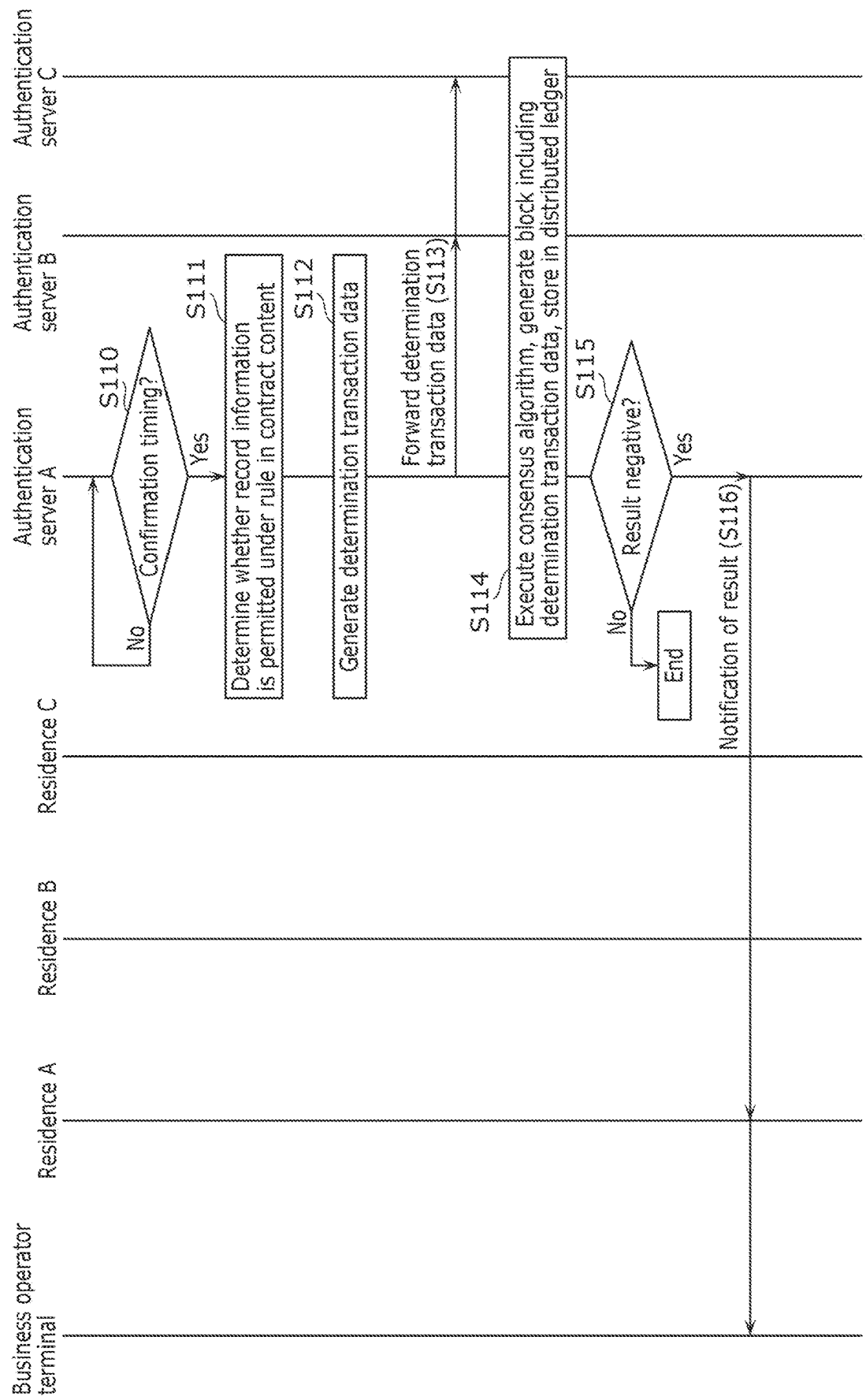
FIG. 7 is a sequence chart illustrating auditing processing by the management system according to Embodiment 1.

FIGS. 6 and 7 are sequence charts illustrating auditing processing by the management system according to Embodiment 1. FIG. 7 illustrates the continuation of the processing illustrated in FIG. 6.

First, assume that the business operator using business operator terminal 10 has agreed to a contract with user A. Business operator terminal 10 transmits the contract transaction data, including the contract information indicating this contract, to authentication server 50 (S101). Note that the business operator enters into contracts with other user B and user C and transmits the contract transaction data including the contract information indicating the contracts to authentication server 50 in the same manner. Note also that business operator terminal 10 may broadcast the contract transaction data including the contract information to authentication servers A to C.

Next, authentication server A receives the contract transaction data and forwards the received contract transaction data to the other authentication server B and authentication server C (S102).

Next, authentication server A, authentication server B, and authentication server C execute the consensus algorithm, generate a block including the contract transaction data, and store the block in distributed ledger 505 (S103).

When a contract is entered into individually between the business operator and user A, the business operator provides the service to user A. Then, at residence A of user A, generating device 20 of residence A (i.e., generating device A) measures an actual value of the usage amount by user A of the service provided by the business operator (S104). When a contract is entered into individually between the business operator and the other user B and user C, the business operator provides the service to user B and user C in the same manner. Then, at residence B of user B, generating device B measures an actual value of the usage amount by user B of the service provided by the business operator, and at residence C of user C, generating device C measures an actual value of the usage amount by user C of the service provided by the business operator.

Next, generating device 20 of residence A determines whether or not the predetermined timing has arrived (S105).

Next, when it is determined that the predetermined timing has arrived, generating device 20 of residence A generates the first record information based on the measured usage amount of the service, and generates the record transaction data including the generated first record information (S106).

Next, generating device 20 of residence A transmits the generated record transaction data to authentication servers A to C (S107). Note that generating device 20 may broadcast the record transaction data including the record information to authentication servers A to C.

Here, although not illustrated in FIG. 6, the processing of steps S105 to S107 is performed in generating device 20 of residence B and generating device 20 of residence C, in the same manner as with generating device 20 of residence A. Accordingly, the record transaction data including the record information pertaining to the usage amount of the service used by users A to C is transmitted to authentication servers A to C.

Next, authentication server A receives the record transaction data and forwards the received record transaction data to the other authentication server B and authentication server C (S108).

Next, authentication server A, authentication server B, and authentication server C execute the consensus algorithm, generate a block including the record transaction data, and store the block in distributed ledger 505 (S109).

Next, authentication server A determines whether or not the confirmation timing has arrived (S110).

If it is determined that the confirmation timing has arrived (Yes in S110), authentication server A determines whether or not the first record information is permitted under the rule in the contract content of the contract entered into by the business operator and the first user (S111). Note that the sequence returns to step S110 if authentication server A determines that the confirmation timing has not arrived (No in S110).

Next, authentication server A generates the determination transaction data, which includes a result of the determination as to whether or not the first record information is permitted under a rule in the contract content of the contract entered into by the business operator and the first user (S112).

Next, authentication server A forwards the generated determination transaction data to the other authentication server B and authentication server C (S113).

Next, authentication server A, authentication server B, and authentication server C execute the consensus algorithm, generate a block including the determination transaction data, and store the block in distributed ledger 505 (S114).

Next, authentication server A determines whether or not the result of determining whether or not the first record information is permitted under a rule in the contract content of the contract entered into by the business operator and the first user is negative (S115).

If it is determined that the result of the determination is negative (Yes in S115), authentication server A notifies business operator terminal 10 or terminal A of user A (i.e., terminal 30a) of the negative determination result (S116).

Once step S116 ends, or if it is determined that the determination result is positive (No in S115), authentication server A ends the auditing processing.

Effects, Etc.

As described above, the management system and the like according to Embodiment 1 not only can determine whether or not the first record information pertaining to the usage record by the user of the service provided by the business operator is permitted under the rule based on the contract, but also can store the determination transaction data including that determination result in a distributed ledger.

This makes it possible to audit whether the usage record by the user of the service provided by the business operator is permitted under the rule based on the contract, which makes it possible to suppress situations where the business operator and the user collude on a contract. Additionally, the determination result is stored in the distributed ledger, and thus the determination result can be prevented from being tampered with at a later date. Accordingly, situations where the business operator and the user collude on a contract can be suppressed more reliably.

Variation 1

Figure 8:
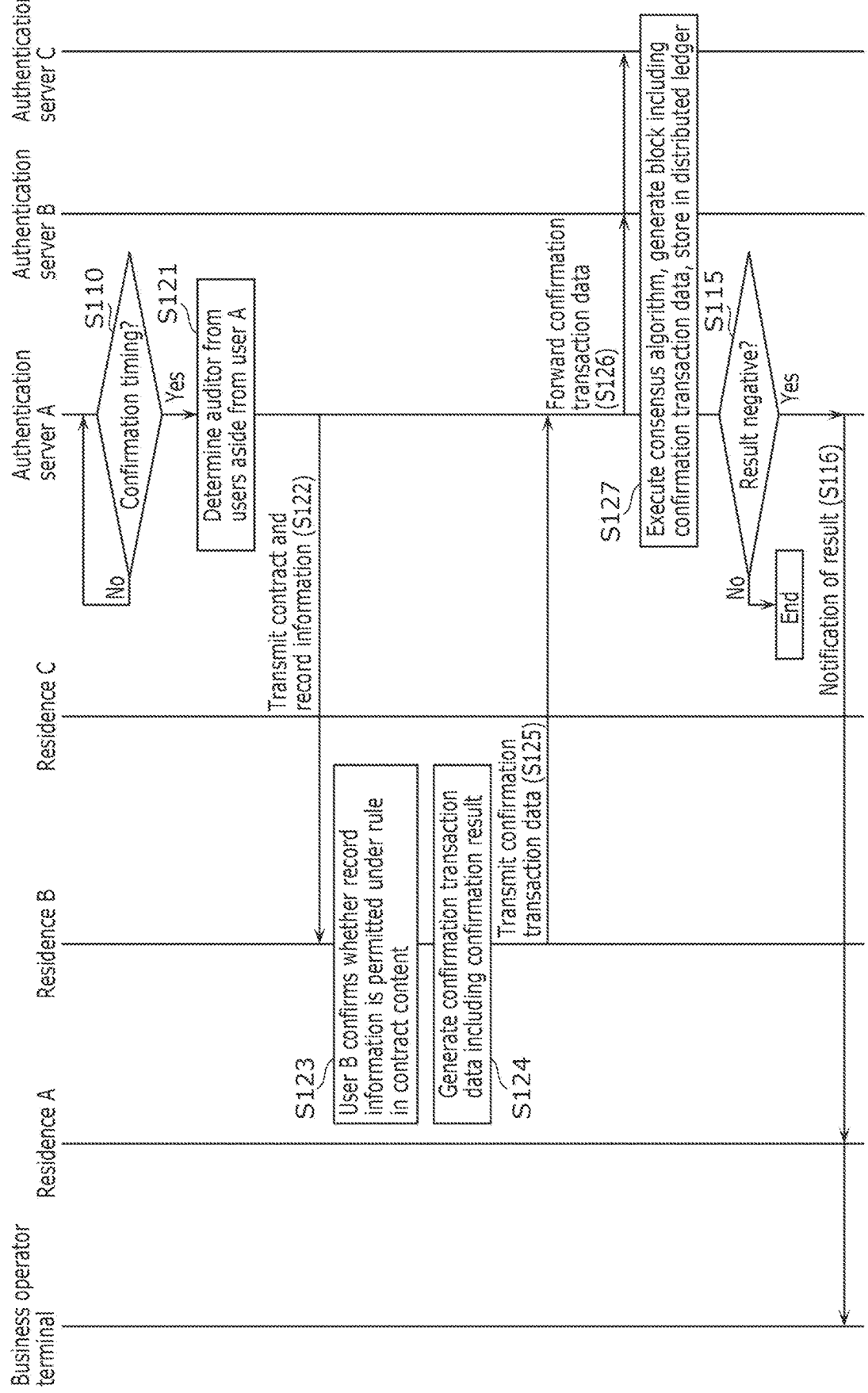
FIG. 8 is a sequence chart illustrating auditing processing by the management system according to Variation 1 on Embodiment 1.

Of the auditing processing by the management system, part of the processing from step S110 on, described with reference to FIG. 7, may be replaced as illustrated in FIG. 8.

FIG. 8 is a sequence chart illustrating auditing processing by the management system according to Variation 1 on Embodiment 1. Note that the processing up to step S110 is the same as the auditing processing described in Embodiment 1.

Authentication server A determines whether or not the confirmation timing has arrived (S110).

When it is determined that the confirmation timing has arrived (Yes in S110), authentication server A sets an auditor from among a plurality of users aside from user A and including user B and user C, who belong to the same group as user A (S121). When setting an auditor from among a plurality of users aside from user A and including user B and user C, who belong to the same group as user A, authentication server A may determine the auditor at random, may determine the auditor based on a resident registry, or may determine the auditor based on a predetermined table including the plurality of users. Note that the sequence returns to step S110 if authentication server A determines that the confirmation timing has not arrived (No in S110).

Once the auditor is set, authentication server A transmits the contract information and the record information to terminal 30 used by the user who is the auditor that has been set (S122). For example, if user B is set as the auditor, authentication server A transmits the contract information and the record information of user A to terminal 30b used by user B. The record information transmitted in this manner may be the newest record information among the record information stored in the distributed ledger, may be record information including the newest record information, or may be past record information excluding the newest record information.

When the contract information and the record information are received, terminal 30b confirms with user B whether or not the first record information is permitted under the rule in the contract content of the contract entered into by the business operator and the first user (S123). Specifically, when the contract information and the record information are received, terminal 30b displays, in display 303, a display (user interface; UI) for confirming with the second user whether or not the first record information is permitted under the rule in the contract content of the contract entered into by the business operator and the first user, based on the contract information and the record information transmitted from authentication server A. Through this, terminal 30b prompts user B to use inputter 302 to make an input indicating whether or not the first record information is permitted under the rule in the contract content of the contract entered into by the business operator and the first user.

When an input indicating whether or not the first record information is permitted under the rule in the contract content of the contract entered into by the business operator and the first user is accepted through inputter 302, terminal 30b generates the confirmation transaction data including the confirmation result indicated by that input (S124).

Terminal 30b transmits the confirmation transaction data, including the generated confirmation result, to authentication server A (S125).

Next, authentication server A receives the confirmation transaction data, and forwards the received confirmation transaction data to the other authentication server B and authentication server C (S126).

Next, authentication server A, authentication server B, and authentication server C execute the consensus algorithm, generate a block including the confirmation transaction data, and store the block in distributed ledger 505 (S127).

Steps S115 and S116 which follow thereafter are the same as in Embodiment 1, and will therefore not be described here.

Variation 2

Figure 9:
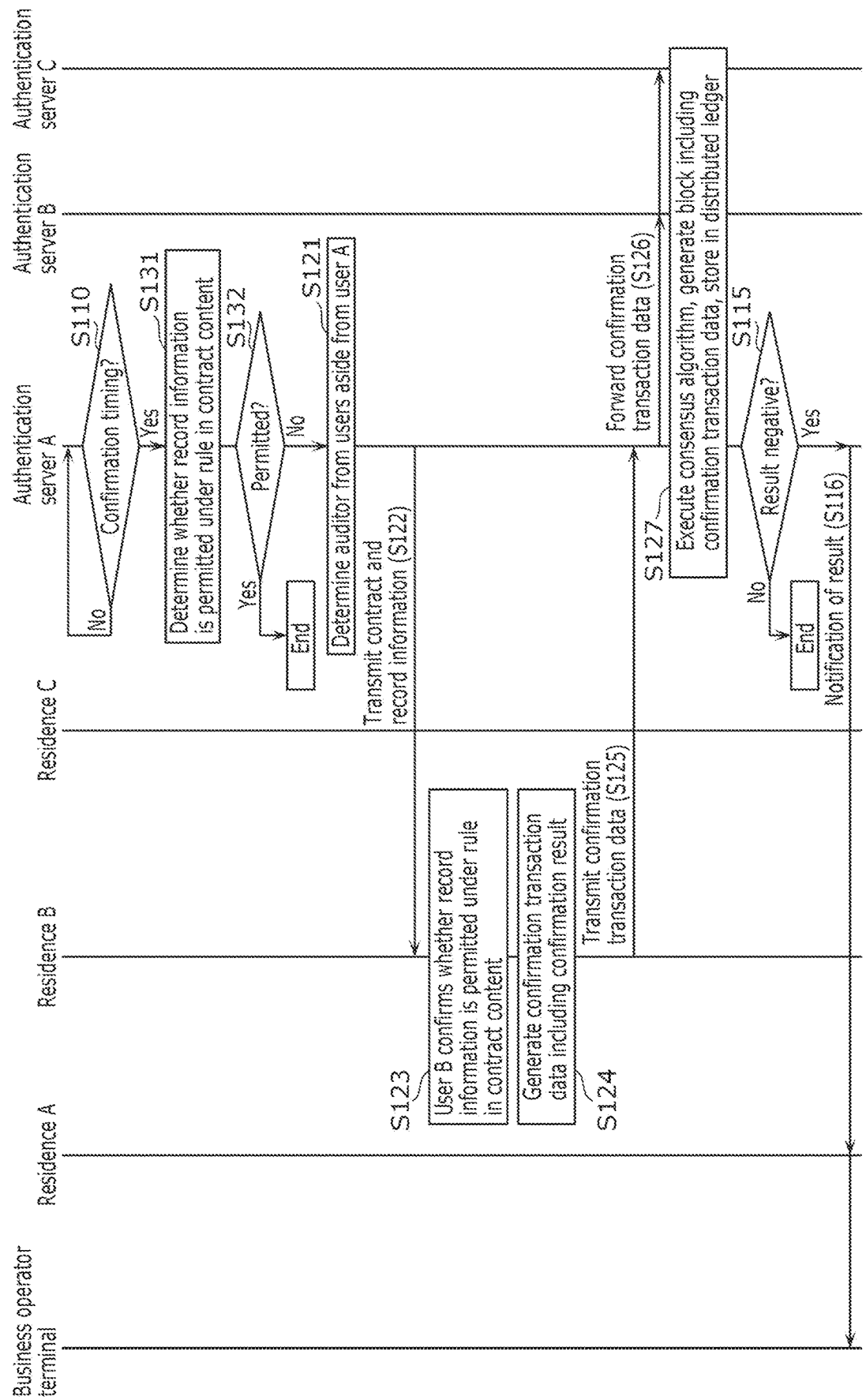
FIG. 9 is a sequence chart illustrating auditing processing by the management system according to Variation 2 on Embodiment 1.

Of the auditing processing by the management system, part of the processing from step S110 on, described with reference to FIG. 7, may be replaced as illustrated in FIG. 9.

FIG. 9 is a sequence chart illustrating auditing processing by the management system according to Variation 2 on Embodiment 1. Note that the processing up to step S110 is the same as the auditing processing described in Embodiment 1.

Authentication server A determines whether or not the confirmation timing has arrived (S110).

If it is determined that the confirmation timing has arrived (Yes in S110), authentication server A determines whether or not the first record information is permitted under the rule in the contract content of the contract entered into by the business operator and the first user (S131). Step S131 is the same as step S111. Note that the sequence returns to step S110 if authentication server A determines that the confirmation timing has not arrived (No in S110).

Next, if it has been determined that the first record information is permitted under the rule in the contract content of the contract entered into by the business operator and the first user (Yes in S132), authentication server A ends the auditing processing. If it has been determined that the first record information is not permitted under the rule in the contract content of the contract entered into by the business operator and the first user (No in S132), authentication server A moves to steps S121 to S127.

Steps S121 to S127 are the same as steps S121 to S127 in Variation 1 on Embodiment 1 and will therefore not be described here.

Once step S127 ends, steps S115 and S116 are performed. Steps S115 and S116 are the same as in Embodiment 1, and will therefore not be described here.

Embodiment 2

Figure 10:
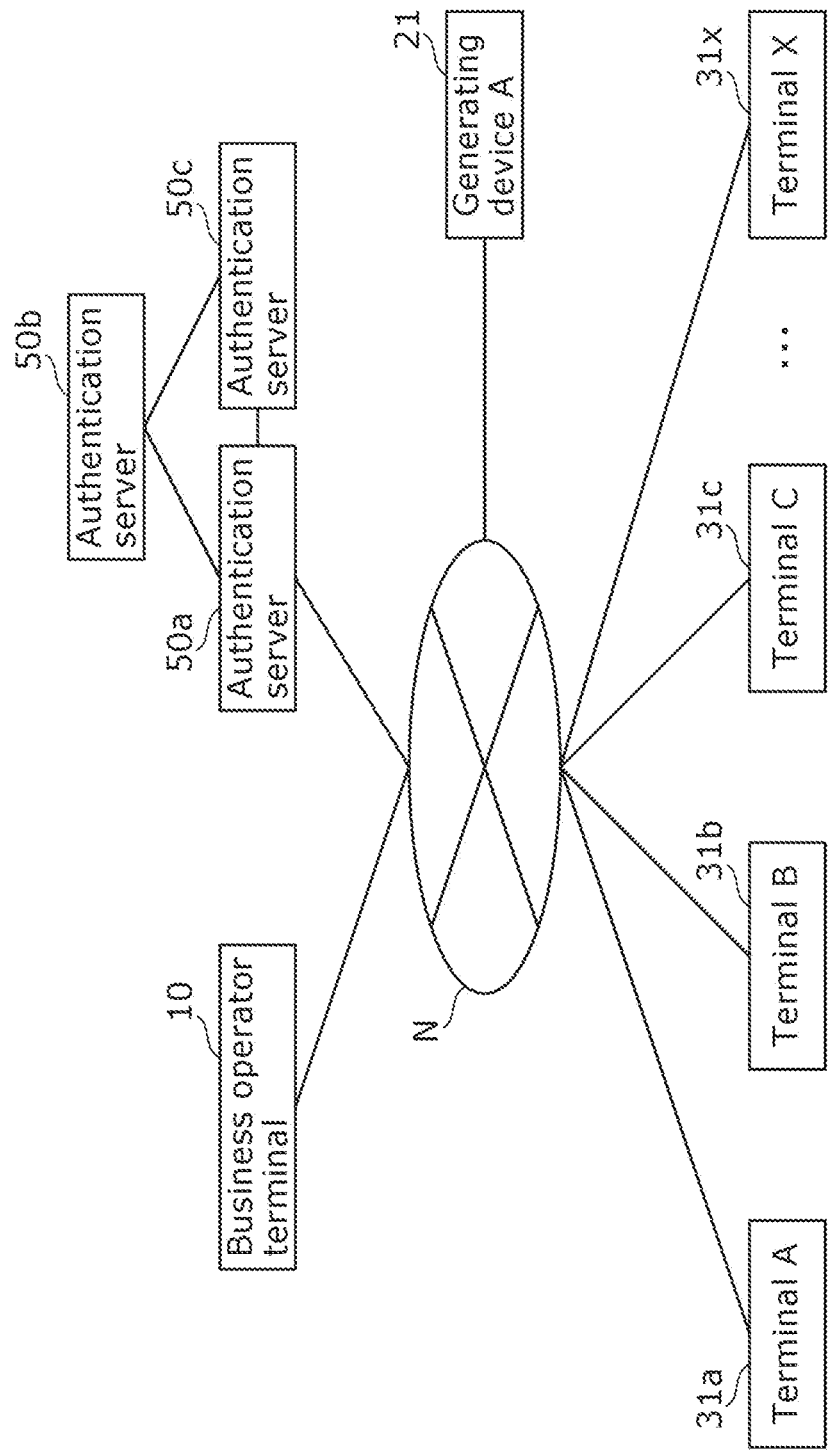
FIG. 10 is a diagram illustrating an example of the configuration of a management system according to Embodiment 2.

FIG. 10 is a diagram illustrating an example of the configuration of a management system according to Embodiment 2.

As illustrated in FIG. 10, the management system according to Embodiment 2 differs from the management system according to Embodiment 1 in terms of the configurations of generating device 21 and terminals 31a to 31x. Specifically, the management system according to Embodiment 2 differs from the management system according to Embodiment 1 in that generating device 21 and terminals 31a to 31x are not in a one-to-one relationship. In Embodiment 1, the usage amount of the service used by each user is measured by generating devices 20 corresponding to the individual users. However, in Embodiment 2, the usage amount of the service used by each user may be measured by generating device 21, which is shared by a plurality of users.

Note that although each of terminal 31a to terminal 31x will also be called "terminal 31" hereinafter, terminal 31a to terminal 31x may also be referred to as "terminal A" to "terminal X".

Figure 11:
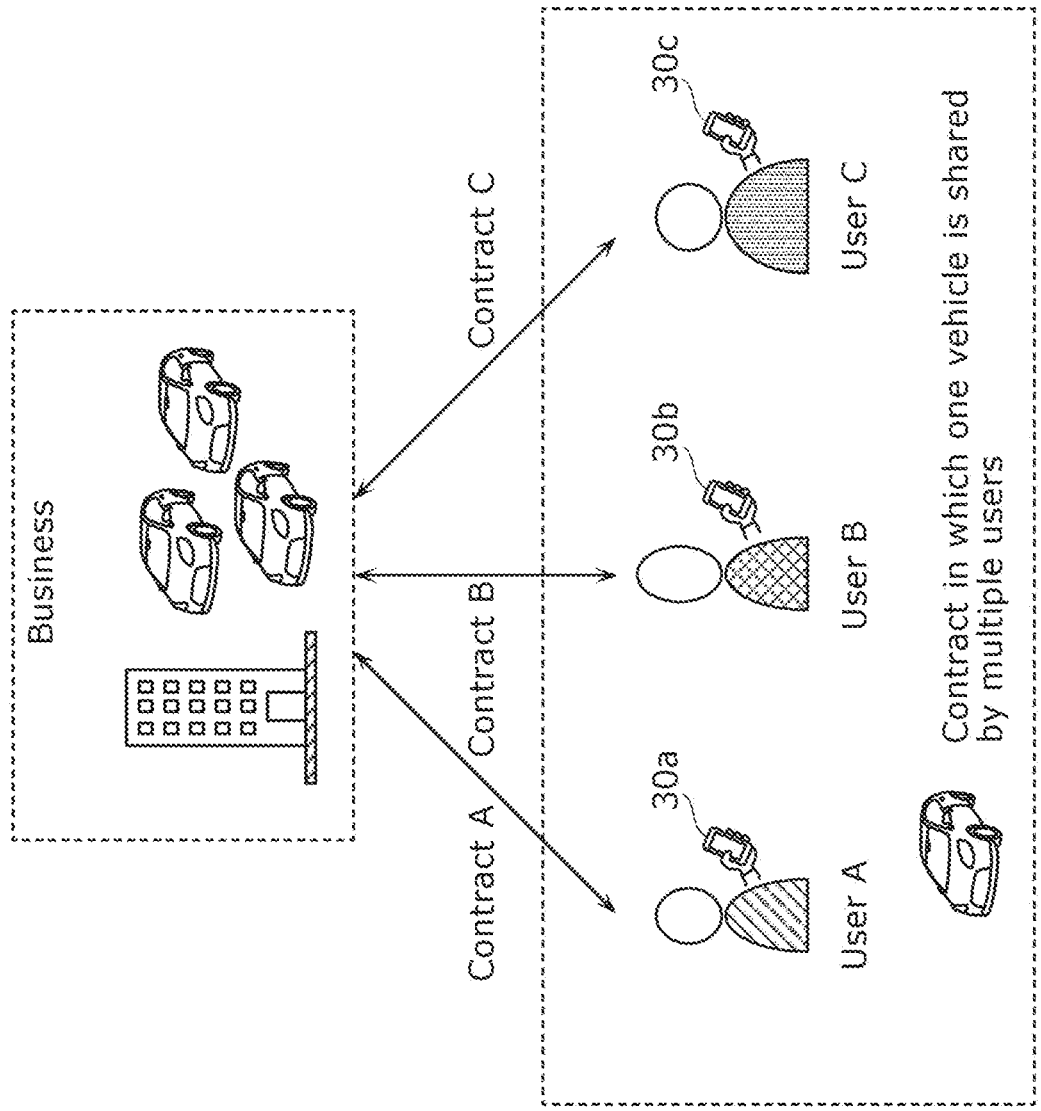
FIG. 11 is a diagram illustrating a contract between a business operator of a sharing service provider business and a user.

For example, as illustrated in FIG. 11, the business operator may be a person who runs a business such as a sharing service provider or the like, or may be an employee of the same. The sharing service provider is, for example, a business that provides a service for using a single moving body to a group constituted by a plurality of users. In this case, the moving body may, for example, be a vehicle such as an automobile or a bicycle, a ship, an aircraft, or the like. Generating device 21 is, for example, the moving body. The group constituted by the plurality of users is a group that uses at least one moving body shared among the plurality of users.

Generating Device 21

Figure 12:
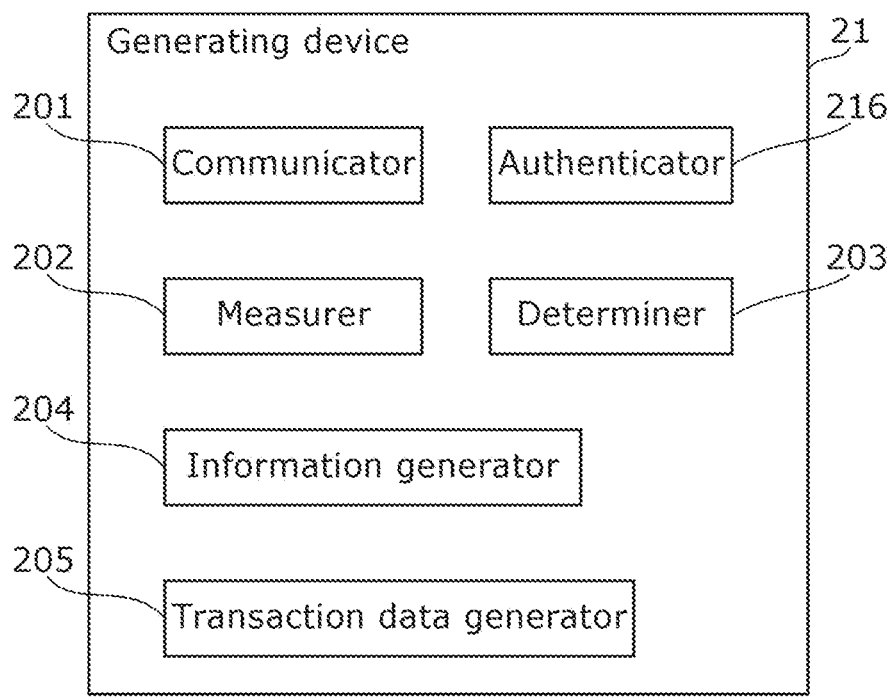
FIG. 12 is a diagram illustrating an example of the configuration of a generating device according to Embodiment 2.

FIG. 12 is a diagram illustrating an example of the configuration of generating device 21 according to Embodiment 2. Elements identical to those in FIG. 3 are given the same reference signs and will not be described in detail.

Generating device 21 illustrated in FIG. 12 differs from generating device 20 according to Embodiment 1 in that the device further includes authenticator 216.

Authenticator 216

Authenticator 216 receives authentication information from terminal 31 and authenticates whether or not the user using terminal 31 is a user permitted to use the moving body including generating device 21 based on the received authentication information. Specifically, authenticator 216 determines whether or not the received authentication information is included in pre-stored information. If the authentication information received from terminal 31 is included in that information, authenticator 216 determines that the user using terminal 31 is a user permitted to use the moving body including generating device 21, whereas if the authentication information is not included in that information, authenticator 216 determines that the user using terminal 31 is a user not permitted to use the moving body.

Note that measurer 202 measures the usage amount of the moving body by the user authenticated by authenticator 216 during a period from the timing when the user is authenticated by authenticator 216 to the timing when end information, which indicates that the user using terminal 31 stops using the moving body, is next received by generating device 21. Accordingly, when the use of the moving body by another user is authenticated in response to receiving the authentication information from terminal 31 used by the other user next, generating device 21 measures the usage amount of the moving body by the other user in a period from the timing of the stated authentication to the timing when generating device 21 receives the end information indicating that the user using terminal 31 stops using the moving body next. The usage amount of the moving body is the same as that described in Embodiment 1 and will therefore not be described here.

Terminal 31

Figure 13:
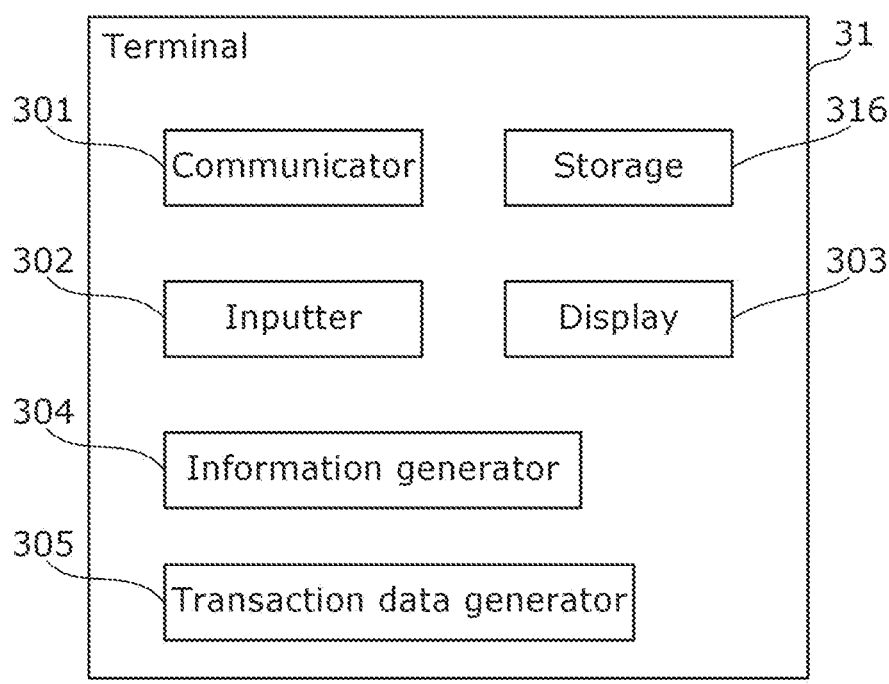
FIG. 13 is a diagram illustrating an example of the configuration of a terminal according to Embodiment 2.

FIG. 13 is a diagram illustrating an example of the configuration of terminal 31 according to Embodiment 2. Elements identical to those in FIG. 4 are given the same reference signs and will not be described in detail.

Terminal 31 illustrated in FIG. 13 differs from terminal 30 according to Embodiment 1 in that the terminal further includes storage 316.

Storage 316

Storage 316 stores the authentication information for authenticating the use of the moving body including generating device 21. The authentication information stored in storage 316 is transmitted to generating device 21 by communicator 301 when, for example, an input for authentication by the user of terminal 31 is accepted by inputter 302. The authentication information may be information received by terminal 31 from an external server in response to the user operating terminal 31 and performing registration with the external server to use the moving body.

Operations, Etc. Of Management System

Operations of the management system configured as described above will be described next.

Figure 14:
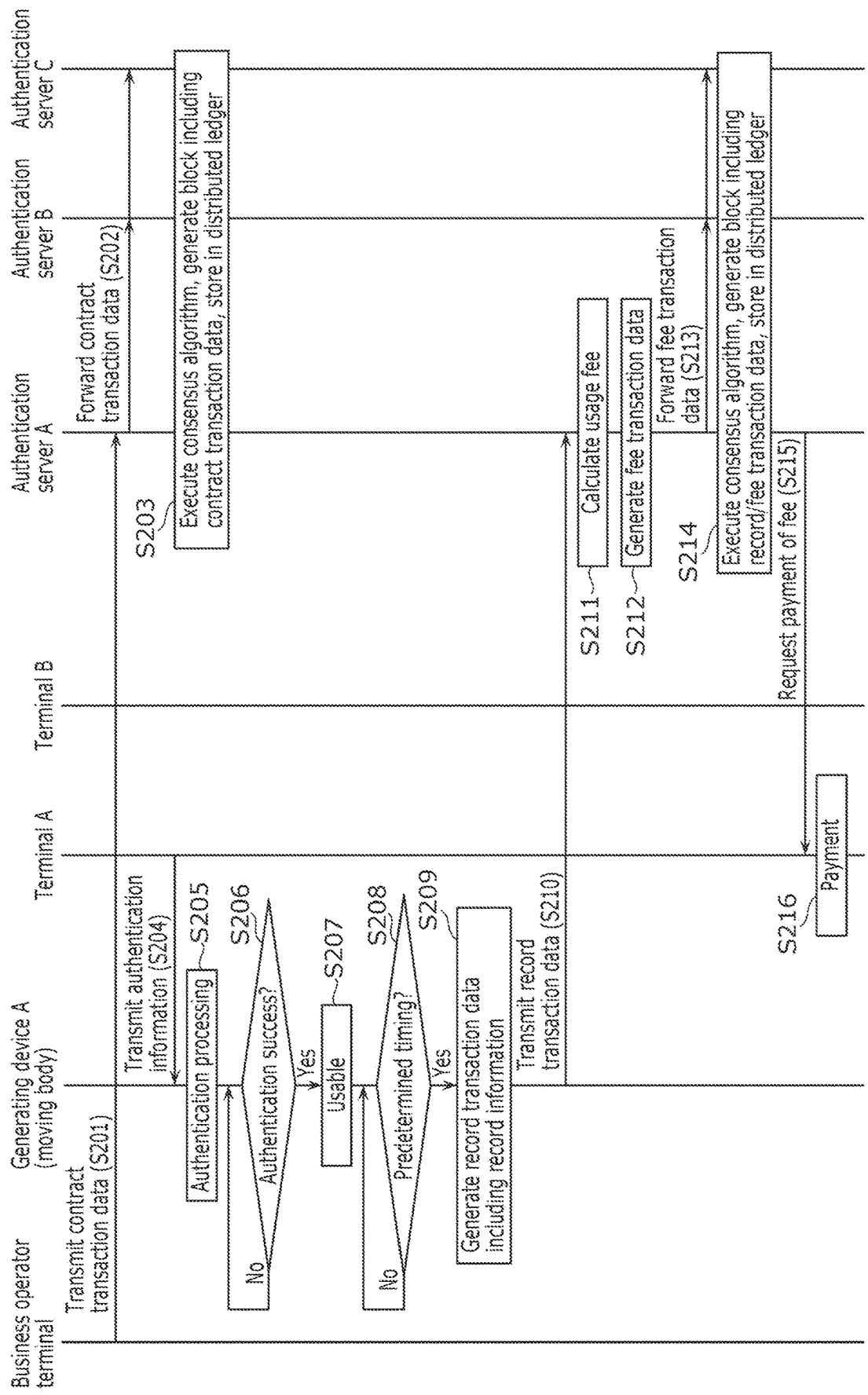
FIG. 14 is a sequence chart illustrating auditing processing by the management system according to Embodiment 2.
Figure 15:
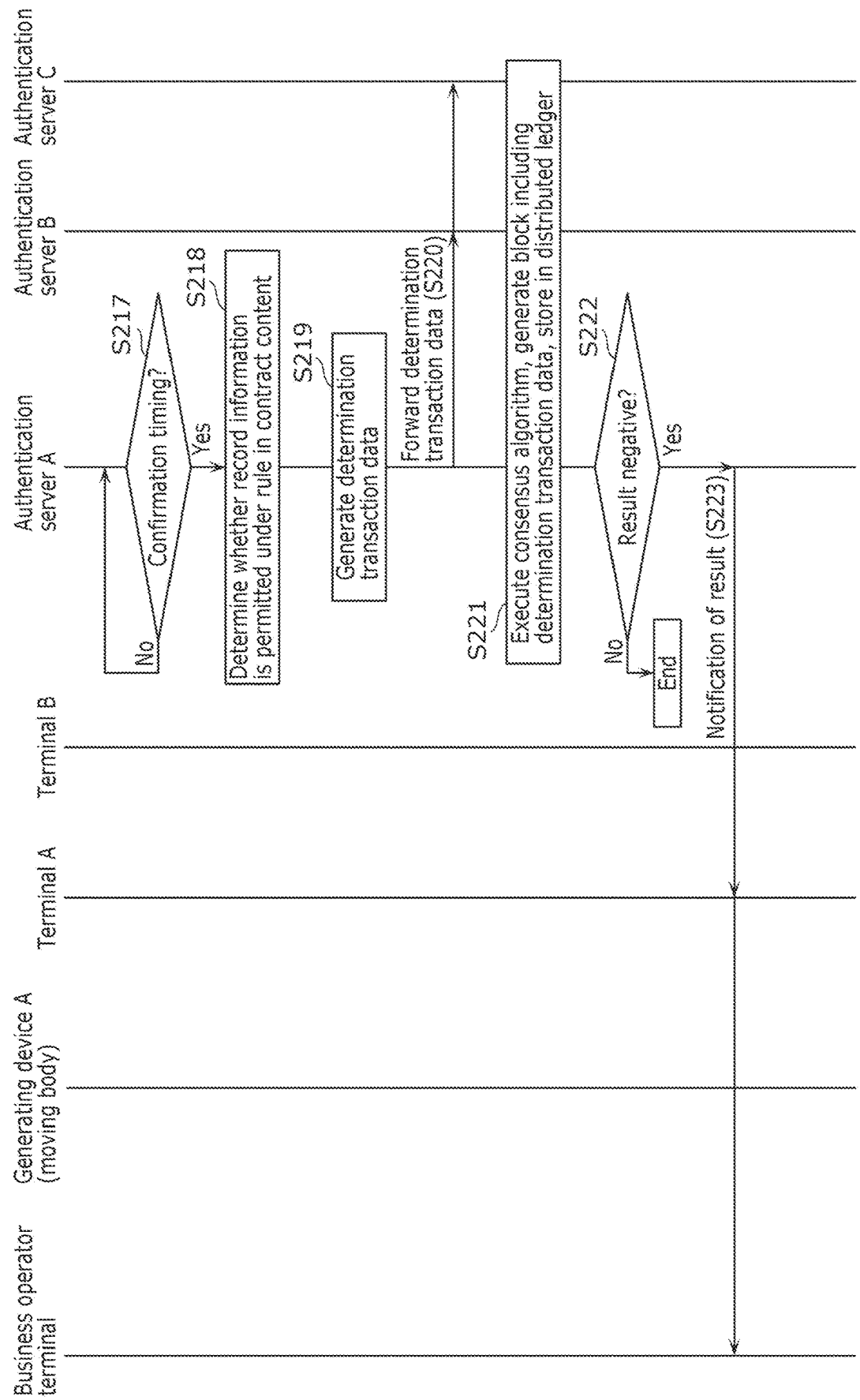
FIG. 15 is a sequence chart illustrating auditing processing by the management system according to Embodiment 2.

FIGS. 14 and 15 are sequence charts illustrating auditing processing by the management system according to Embodiment 2. FIG. 15 illustrates the continuation of the processing illustrated in FIG. 14.

First, assume that the business operator using business operator terminal 10 has agreed to a contract with user A. Business operator terminal 10 transmits the contract transaction data, including the contract information indicating this contract, to authentication server 50 (S201). Note that the business operator enters into contracts with other user B and user C and transmits the contract transaction data including the contract information indicating the contracts to authentication server 50 in the same manner. Note also that business operator terminal 10 may broadcast the contract transaction data including the contract information to authentication servers A to C.

Next, authentication server A receives the contract transaction data, and forwards the received contract transaction data to the other authentication server B and authentication server C (S202).

Next, authentication server A, authentication server B, and authentication server C execute the consensus algorithm, generate a block including the contract transaction data, and store the block in distributed ledger 505 (S203).

Next, terminal A transmits the authentication information to generating device 21 of the moving body in response to an operation for the authentication, performed by user A using the moving body, being accepted by terminal A (S204).

Generating device 21 receives the authentication information from terminal A and performs authentication processing for authenticating whether or not user A using terminal A is a user permitted to use the moving body including generating device 21 based on the received authentication information (S205).

Next, if the authentication succeeds (Yes in S206), i.e., if it is determined based on the received authentication information that user A using terminal A is a user permitted to use the moving body including generating device 21, generating device 21 shifts the moving body to a usable state (S207). If the authentication fails (No in S206), generating device 21 keeps the moving body in an unusable state, and returns to step S206. Note that generating device 21 may shift the moving body to the usable state in response to a door for entering a cabin of the moving body being unlocked, or may shift the moving body to the usable state in response to a switch for driving the moving body being turned on. Conversely, generating device 21 may put the moving body in the unusable state in response to a door for entering a cabin of the moving body being locked, or may put the moving body in the unusable state in response to a switch for driving the moving body being turned off.

Next, generating device 21 determines whether or not the predetermined timing has arrived (S208).

Next, when it is determined that the predetermined timing has arrived, generating device 21 generates the first record information based on the measured usage amount of the service, and generates the record transaction data including the generated first record information (S209). The first record information may include user information for specifying the user authenticated in step S205. Note that generating device 21 may determine that the predetermined timing has arrived when generating device 21 receives the end information indicating that user A using terminal A stops using the moving body.

Next, generating device 21 transmits the generated record transaction data to authentication servers A to C (S210). Note that generating device 21 may broadcast the record transaction data including the record information to authentication servers A to C.

Here, although not illustrated in FIG. 14, generating device 21 performs the processing of steps S205 to S210 in response to the authentication information being received from a terminal aside from terminal A (e.g., terminal B), in the same manner as when the authentication information is received from terminal A. Accordingly, the record transaction data including the record information pertaining to the usage amount of the service used by users A to C is transmitted to authentication servers A to C.

Next, authentication server A receives the record transaction data, and based on the record information included in the received record transaction data, calculates a usage fee for the service for the usage amount indicated by the record information (S211).

Next, authentication server A generates fee transaction data including the calculated usage fee (S212).

Next, authentication server A forwards the generated fee transaction data to the other authentication server B and authentication server C (S213).

Next, authentication server A, authentication server B, and authentication server C execute the consensus algorithm, generate a block including the record transaction data and a block including the fee transaction data, and store the blocks in distributed ledger 505 (S214).

Next, one of authentication servers A to C transmits, to terminal A, a request for payment of the usage fee calculated in step S211 (S215).

Next, terminal A makes a payment by displaying a display (UI) prompting user A to pay the usage fee and accepting an input for payment from user A (S216).

Next, authentication server A determines whether or not the confirmation timing has arrived (S217).

If it is determined that the confirmation timing has arrived (Yes in S217), authentication server A determines whether or not the first record information is permitted under the rule in the contract content of the contract entered into by the business operator and the first user (S218). Note that the sequence returns to step S217 if authentication server A determines that the confirmation timing has not arrived (No in S217).

Next, authentication server A generates the determination transaction data, which includes a result of the determination as to whether or not the first record information is permitted under a rule in the contract content of the contract entered into by the business operator and the first user (S219).

Next, authentication server A forwards the generated determination transaction data to the other authentication server B and authentication server C (S220).

Next, authentication server A, authentication server B, and authentication server C execute the consensus algorithm, generate a block including the determination transaction data, and store the block in distributed ledger 505 (S221).

Next, authentication server A determines whether or not the result of determining whether or not the first record information is permitted under a rule in the contract content of the contract entered into by the business operator and the first user is negative (S222).

If it is determined that the result of the determination is negative (Yes in S222), authentication server A notifies business operator terminal 10 or terminal A of user A (i.e., terminal 30a) of the negative determination result (S223).

Once step S223 ends, or if it is determined that the determination result is positive (No in S222), authentication server A ends the auditing processing.

Effects, Etc.

As described above, even when a single generating device 21 measures usage records of a service by a plurality of users individually for each of the users, the management system and the like according to Embodiment 2 not only can determine whether or not the first record information pertaining to the usage record by the user of the service provided by the business operator is permitted under the rule based on the contract, but also can store the determination transaction data including that determination result in a distributed ledger.

This makes it possible to audit whether the usage record by the user of the service provided by the business operator is permitted under the rule based on the contract, which makes it possible to suppress situations where the business operator and the user collude on a contract. Additionally, the determination result is stored in the distributed ledger, and thus the determination result can be prevented from being tampered with at a later date. Accordingly, situations where the business operator and the user collude on a contract can be suppressed more reliably.

Variation 1

Figure 16:
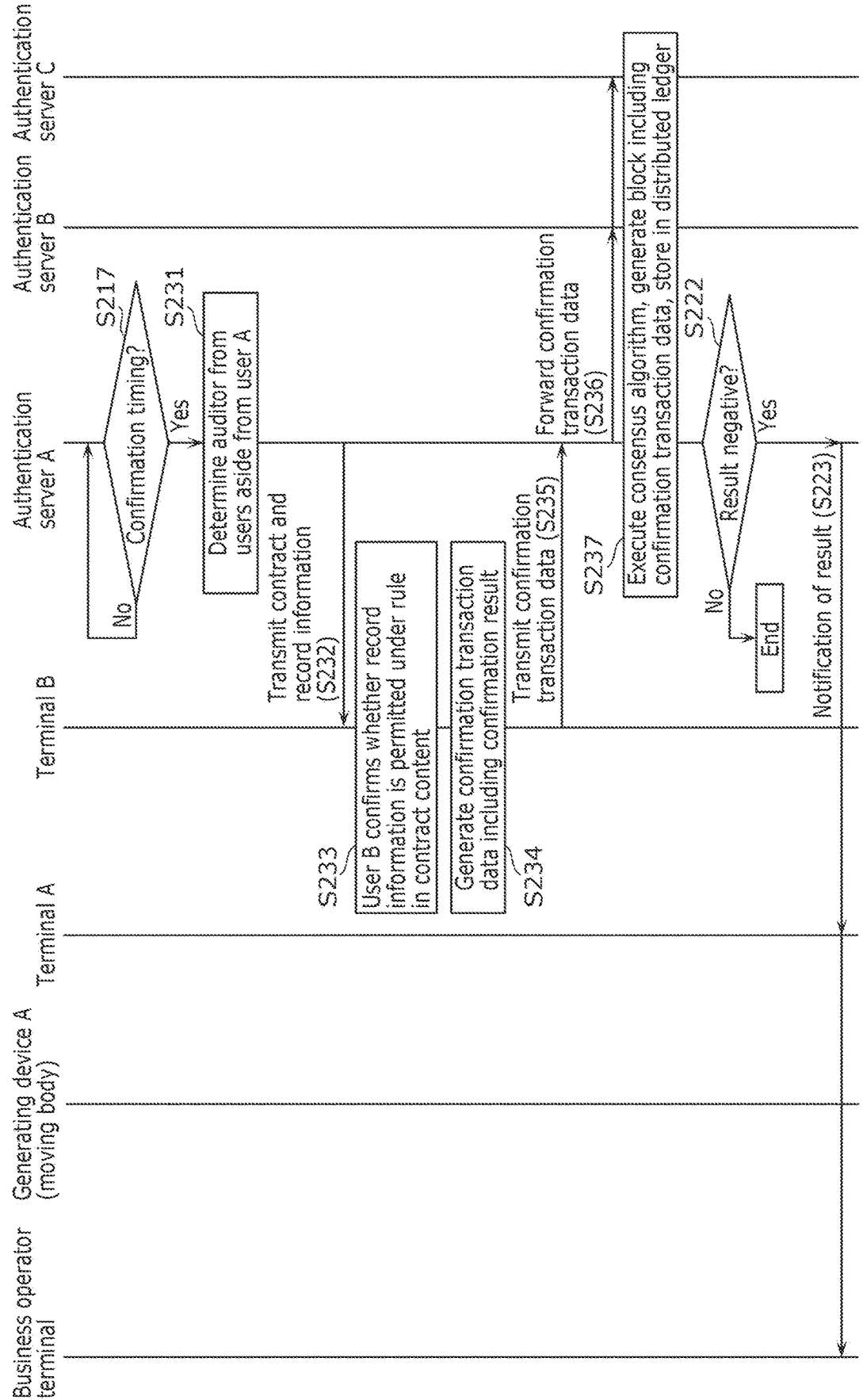
FIG. 16 is a sequence chart illustrating auditing processing by the management system according to Variation 1 on Embodiment 2.

Of the auditing processing by the management system, part of the processing from step S217 on, described with reference to FIG. 15, may be replaced as illustrated in FIG. 16.

FIG. 16 is a sequence chart illustrating auditing processing by the management system according to Variation 1 on Embodiment 2. Note that the processing up to step S217 is the same as the auditing processing described in Embodiment 2.

Authentication server A determines whether or not the confirmation timing has arrived (S217).

When it is determined that the confirmation timing has arrived (Yes in S217), authentication server A sets an auditor from among a plurality of users aside from user A and including user B and user C, who belong to the same group as user A (S231). When setting an auditor from among a plurality of users aside from user A and including user B and user C, who belong to the same group as user A, authentication server A may determine the auditor at random, may determine the auditor based on a resident registry, or may determine the auditor based on a predetermined table including the plurality of users. Note that the sequence returns to step S217 if authentication server A determines that the confirmation timing has not arrived (No in S217).

Once the auditor is set, authentication server A transmits the contract information and the record information to terminal 30 used by the user who is the auditor that has been set (S232). For example, if user B is set as the auditor, authentication server A transmits the contract information and the record information of user A to terminal 30b used by user B. The record information transmitted in this manner may be the newest record information among the record information stored in the distributed ledger, may be record information including the newest record information, or may be past record information excluding the newest record information.

When the contract information and the record information are received, terminal 30b confirms with user B whether or not the first record information is permitted under the rule in the contract content of the contract entered into by the business operator and the first user (S233). Specifically, when the contract information and the record information are received, terminal 30b displays, in display 303, a display (user interface; UI) for confirming with the second user whether or not the first record information is permitted under the rule in the contract content of the contract entered into by the business operator and the first user, based on the contract information and the record information transmitted from authentication server A. Through this, terminal 30b prompts user B to use inputter 302 to make an input indicating whether or not the first record information is permitted under the rule in the contract content of the contract entered into by the business operator and the first user.

When an input indicating whether or not the first record information is permitted under the rule in the contract content of the contract entered into by the business operator and the first user is accepted through inputter 302, terminal 30b generates the confirmation transaction data including the confirmation result indicated by that input (S234).

Terminal 30b transmits the confirmation transaction data, including the generated confirmation result, to authentication server A (S235).

Next, authentication server A receives the confirmation transaction data, and forwards the received confirmation transaction data to the other authentication server B and authentication server C (S236).

Next, authentication server A, authentication server B, and authentication server C execute the consensus algorithm, generate a block including the confirmation transaction data, and store the block in distributed ledger 505 (S237).

Steps S222 and S223 which follow thereafter are the same as in Embodiment 2, and will therefore not be described here.

Variation 2

Figure 17:
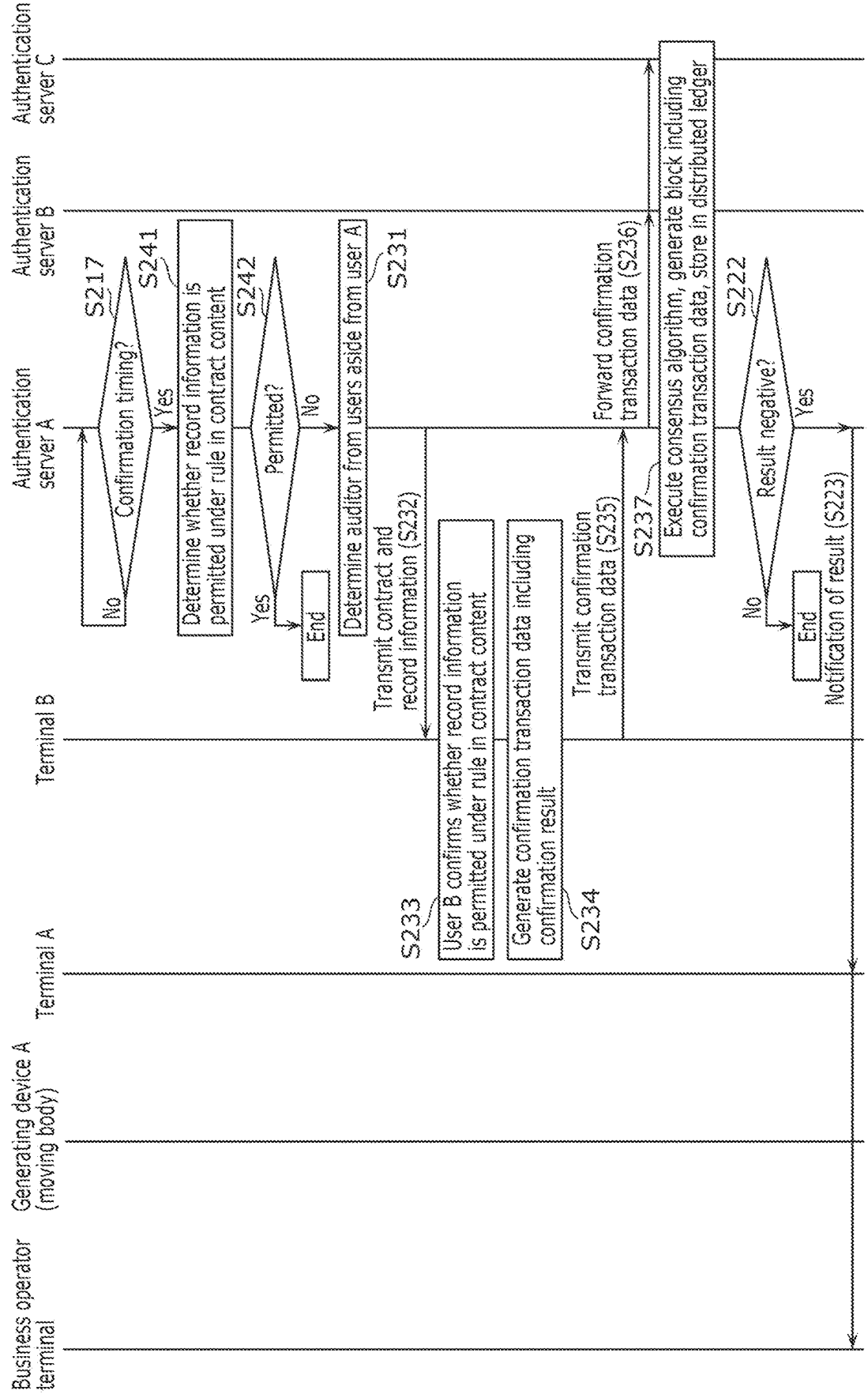
FIG. 17 is a sequence chart illustrating auditing processing by the management system according to Variation 2 on Embodiment 2.

Of the auditing processing by the management system, part of the processing from step S217 on, described with reference to FIG. 15, may be replaced as illustrated in FIG. 17.

FIG. 17 is a sequence chart illustrating auditing processing by the management system according to Variation 2 on Embodiment 2. Note that the processing up to step S217 is the same as the auditing processing described in Embodiment 2.

Authentication server A determines whether or not the confirmation timing has arrived (S217).

If it is determined that the confirmation timing has arrived (Yes in S217), authentication server A determines whether or not the first record information is permitted under the rule in the contract content of the contract entered into by the business operator and the first user (S241). Step S241 is the same as step S218. Note that the sequence returns to step S217 if authentication server A determines that the confirmation timing has not arrived (No in S217).

Next, if it has been determined that the first record information is permitted under the rule in the contract content of the contract entered into by the business operator and the first user (Yes in S242), authentication server A ends the auditing processing. If it has been determined that the first record information is not permitted under the rule in the contract content of the contract entered into by the business operator and the first user (No in S242), authentication server A moves to steps S231 to S237.

Steps S231 to S237 are the same as steps S231 to S237 in Variation 1 on Embodiment 2 and will therefore not be described here.

Once step S237 ends, steps S222 and S223 are performed. Steps S222 and S223 are the same as in Embodiment 2, and will therefore not be described here.

Embodiment 3

Embodiment 2 describes storing the information included in each instance of transaction data in the distributed ledgers of a plurality of authentication servers 50 included in the management system, but the configuration is not limited thereto. The management system may include a business operator terminal and a plurality of terminals which each have a distributed ledger, without having an authentication server. In such a case, the audit results may be stored in the distributed ledgers of the business operator terminal and the plurality of terminals for validated contracts. The following descriptions will focus on points which are different from Embodiment 1 and Embodiment 2.

Management System

Figure 18:
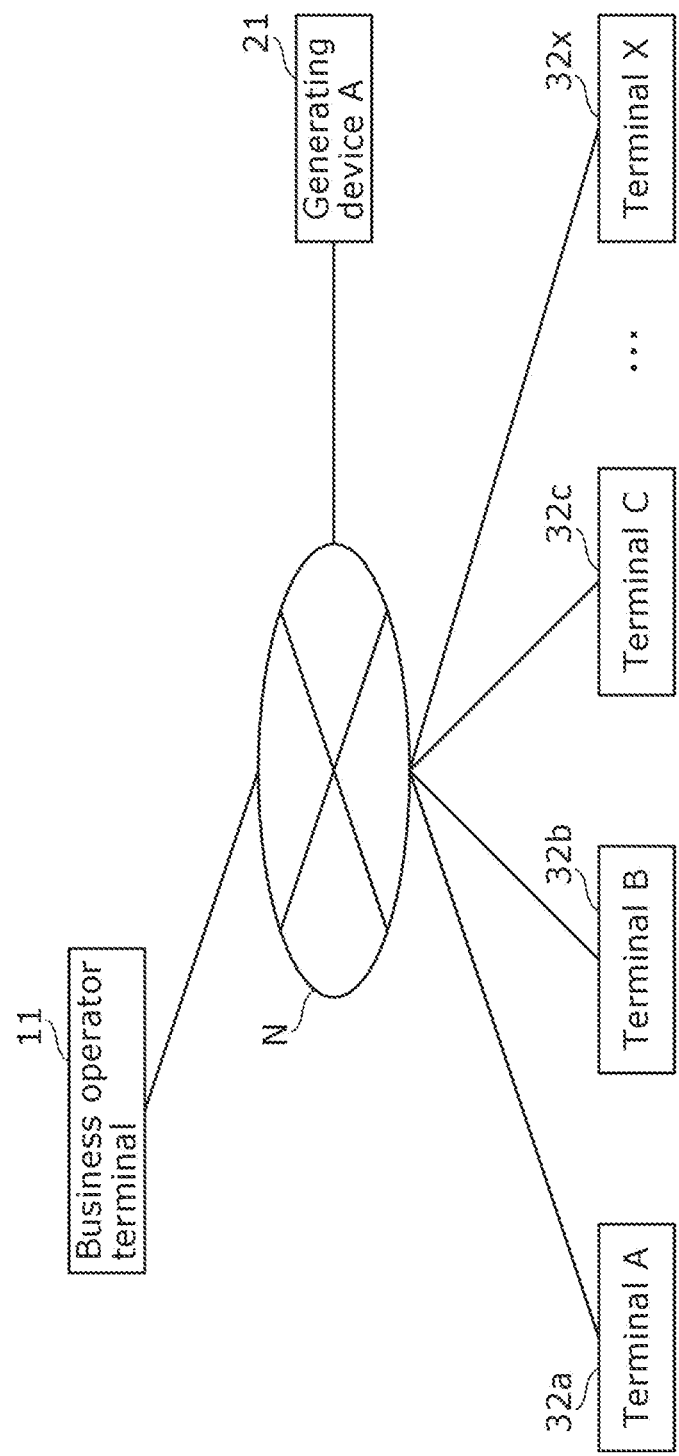
FIG. 18 is a diagram illustrating an example of the configuration of a management system according to Embodiment 3.

FIG. 18 is a diagram illustrating an example of the configuration of a management system according to Embodiment 3. Elements identical to those in FIGS. 1 and 10 are given the same reference signs and will not be described in detail.

The management system illustrated in FIG. 18 differs from the management system according to Embodiment 2 in that the plurality of authentication servers 50 are not provided, and the configurations of business operator terminal 11 and terminals 32a to 32x are different. Note that although each of terminal 32a to terminal 32x will also be called "terminal 32" hereinafter, terminal 32a to terminal 32x may also be referred to as "terminal A" to "terminal X".

Business operator terminal 11 will be described first.

Business Operator Terminal 11

Like business operator terminal 10, business operator terminal 11 is an example of a terminal used by a business. Business operator terminal 11 may be a personal computer, for example, or may be a mobile terminal such as a smartphone, a tablet, or the like.

Figure 19:
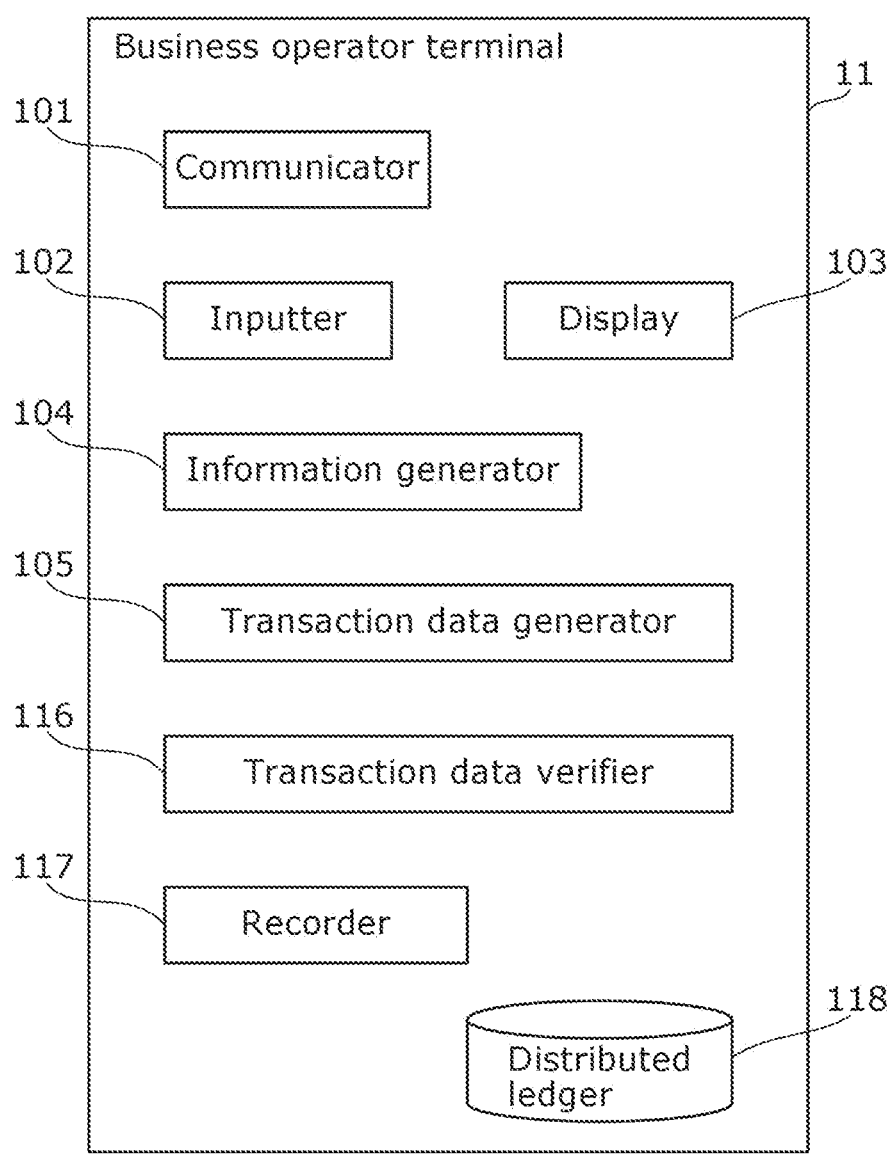
FIG. 19 is a diagram illustrating an example of the configuration of a business operator terminal according to Embodiment 3.

FIG. 19 is a diagram illustrating an example of the configuration of business operator terminal 11 according to Embodiment 3. Elements identical to those in FIG. 2 are given the same reference signs and will not be described in detail.

Business operator terminal 11 illustrated in FIG. 19 differs from business operator terminal 10 according to Embodiment 2 in that transaction data verifier 116, recorder 117, and distributed ledger 118 are further included.

Transaction Data Verifier 116

When communicator 101 receives transaction data, transaction data verifier 116 verifies the validity of the transaction data. Note that this verification may be skipped.

Additionally, transaction data verifier 116, along with the plurality of terminals 32, executes a consensus algorithm for agreeing on the validity of the transaction data. When the validity of the transaction data is confirmed, transaction data verifier 116 causes recorder 117 to record the transaction data.

In the present embodiment, transaction data verifier 116 verifies the validity of the contract transaction data generated by transaction data generator 105 or the validity of the record transaction data, the determination transaction data, and the confirmation transaction data received by communicator 101.

Furthermore, transaction data verifier 116 executes a consensus algorithm for agreeing on the validity of each instance of the transaction data. When the validity of each instance of the transaction data is confirmed, transaction data verifier 116 causes recorder 117 to record each instance of the transaction data.

Recorder 117

By including the transaction data for which the validity has been verified by transaction data verifier 116 in blocks and recording the blocks into distributed ledger 118, recorder 117 records the transaction data.

Note that distributed ledger 118 may be configured within recorder 117.

Distributed Ledger 118

Distributed ledger 118 stores the contract transaction data including the contract information, the record transaction data including the record information, the determination transaction data including the determination result, and the confirmation transaction data including the confirmation information.

Terminal 32a to terminal 32x will be described next. Note that terminal 32a to terminal 32x have the same configuration, and will therefore be referred to as "terminal 32".

Terminal 32

Like terminal 30, terminal 32 is an example of a terminal used by a user. Terminal 32 may be a personal computer, for example, or may be a mobile terminal such as a smartphone, a tablet, or the like. One of terminals 32 is a terminal used by the first user among a plurality of users who have agreed to contracts with the business operator. Additionally, one of terminals 32 is a terminal used by the second user who is different from the first user, among the plurality of users who have agreed to contracts with the business operator.

In the present embodiment, it is assumed that of the plurality of terminals 32, terminal 32a, i.e., terminal A, is a terminal used by the first user. Additionally, it is assumed that of the plurality of terminals 32, terminal 32b, i.e., terminal B, is a terminal used by the second user.

Figure 20:
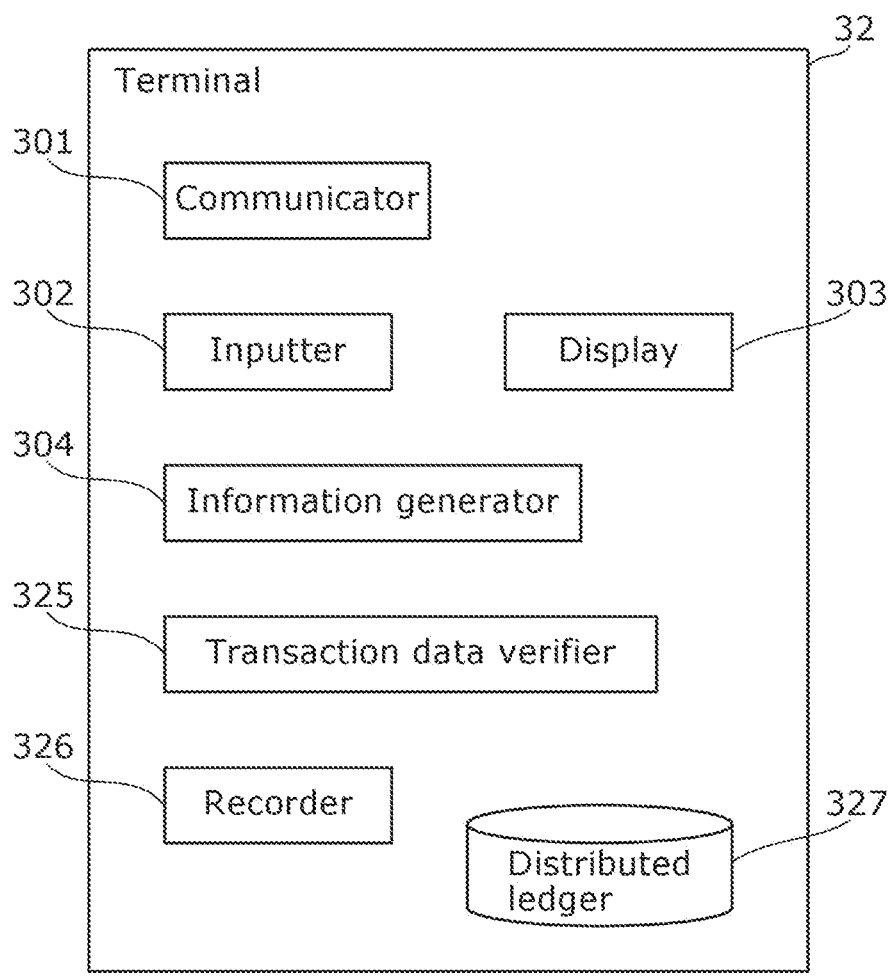
FIG. 20 is a diagram illustrating an example of the configuration of a terminal according to Embodiment 3.

FIG. 20 is a diagram illustrating an example of the configuration of terminal 32 according to Embodiment 3. Elements identical to those in FIG. 4 are given the same reference signs and will not be described in detail.

Terminal 32 illustrated in FIG. 20 differs from terminal 30 according to Embodiment 1 in that transaction data verifier 325, recorder 326, and distributed ledger 327 are further included.

Transaction Data Verifier 325

When communicator 301 receives transaction data, transaction data verifier 325 verifies the validity of the transaction data. Note that this verification may be skipped.

Additionally, transaction data verifier 325, along with the other terminals 32 and business operator terminal 11, executes a consensus algorithm for agreeing on the validity of the transaction data. When the validity of the transaction data is confirmed, transaction data verifier 325 causes recorder 326 to record the transaction data.

In the present embodiment, transaction data verifier 325 verifies the validity of the contract transaction data, the record transaction data, the determination transaction data, and the confirmation transaction data received by communicator 301.

Furthermore, transaction data verifier 325 executes a consensus algorithm for agreeing on the validity of each instance of the transaction data. When the validity of each instance of the transaction data is confirmed, transaction data verifier 325 causes recorder 326 to record each instance of the transaction data.

Recorder 326

By including the transaction data for which the validity has been verified by transaction data verifier 325 in blocks and recording the blocks into distributed ledger 327, recorder 326 records the transaction data.

Note that distributed ledger 327 may be configured within recorder 326.

Distributed Ledger 327

Distributed ledger 327 stores the contract transaction data including the contract information, the record transaction data including the record information, the determination transaction data including the determination result, and the confirmation transaction data including the confirmation information.

Operations, Etc. Of Management System

Operations of the management system configured as described above will be described next.

Figure 21:
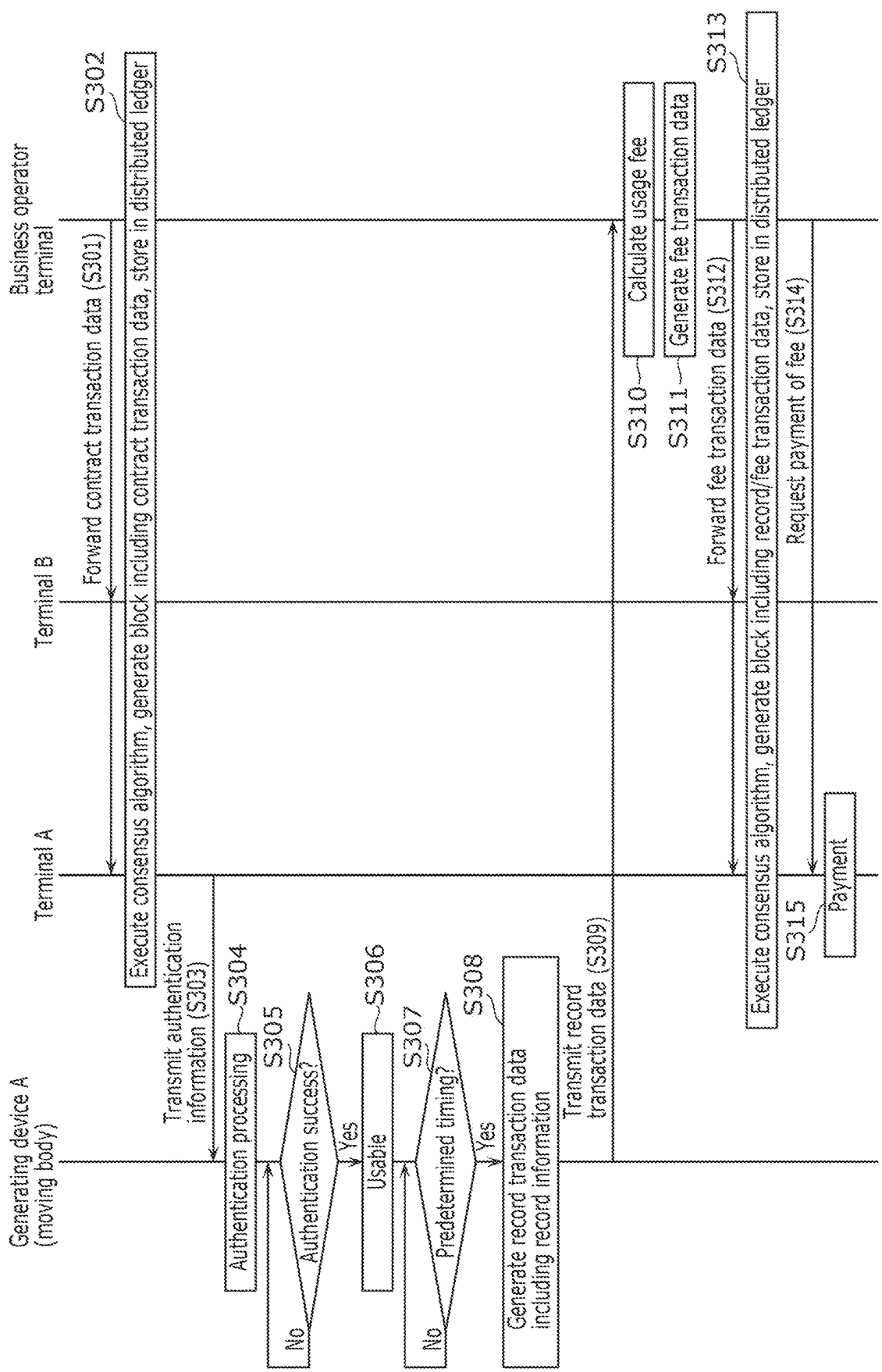
FIG. 21 is a sequence chart illustrating auditing processing by the management system according to Embodiment 3.
Figure 22:
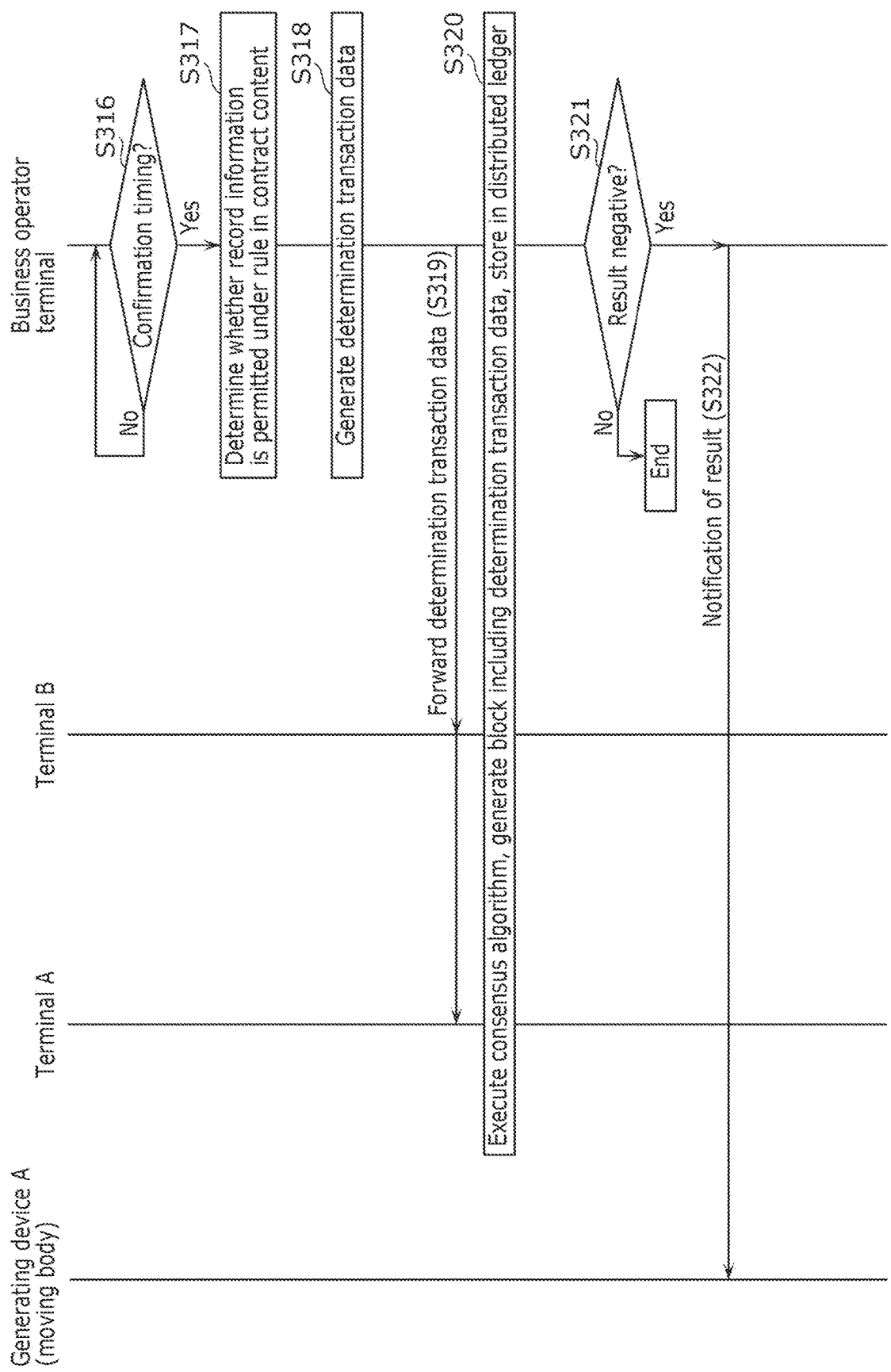
FIG. 22 is a sequence chart illustrating auditing processing by the management system according to Embodiment 3.

FIGS. 21 and 22 are sequence charts illustrating auditing processing by the management system according to Embodiment 3. FIG. 22 illustrates the continuation of the processing illustrated in FIG. 21.

First, assume that the business operator using business operator terminal 11 has agreed to a contract with user A. Business operator terminal 11 forwards the contract transaction data, including the contract information indicating this contract, to the plurality of terminals 32 (S301). Note that the business operator enters into contracts with other user B and user C and transmits the contract transaction data including the contract information indicating the contracts to the plurality of terminals 32 in the same manner. Note also that business operator terminal 11 may broadcast the contract transaction data including the contract information to the plurality of terminals 32.

Next, business operator terminal 11 and the plurality of terminals 32 execute the consensus algorithm, generate a block including the contract transaction data, and store the block in distributed ledgers 118 and 327 (S302).

Next, terminal A transmits the authentication information to generating device 21 of the moving body in response to an operation for the authentication, performed by user A using the moving body, being accepted by terminal A (S303).

Generating device 21 receives the authentication information from terminal A and performs authentication processing for authenticating whether or not user A using terminal A is a user permitted to use the moving body including generating device 21 based on the received authentication information (S304).

Next, if the authentication succeeds (Yes in S305), i.e., if it is determined based on the received authentication information that user A using terminal A is a user permitted to use the moving body including generating device 21, generating device 21 shifts the moving body to a usable state (S306). If the authentication fails (No in S305), generating device 21 keeps the moving body in an unusable state, and returns to step S305. Note that generating device 21 may shift the moving body to the usable state in response to a door for entering a cabin of the moving body being unlocked, or may shift the moving body to the usable state in response to a switch for driving the moving body being turned on. Conversely, generating device 21 may put the moving body in the unusable state in response to a door for entering a cabin of the moving body being locked, or may put the moving body in the unusable state in response to a switch for driving the moving body being turned off.

Next, generating device 21 determines whether or not the predetermined timing has arrived (S307).

Next, when it is determined that the predetermined timing has arrived, generating device 21 generates the first record information based on the measured usage amount of the service, and generates the record transaction data including the generated first record information (S308). The first record information may include user information for specifying the user authenticated in step S304. Note that generating device 21 may determine that the predetermined timing has arrived when generating device 21 receives the end information indicating that user A using terminal A stops using the moving body.

Next, generating device 21 transmits the generated record transaction data to business operator terminal 11 and the plurality of terminals 32 (S309). Note that generating device 21 may broadcast the record transaction data including the record information to business operator terminal 11 and the plurality of terminals 32.

Here, although not illustrated in FIG. 21, generating device 21 performs the processing of steps S304 to S309 in response to the authentication information being received from a terminal aside from terminal A (e.g., terminal B), in the same manner as when the authentication information is received from terminal A. Accordingly, the record transaction data including the record information pertaining to the usage amount of the service used by users A to C is transmitted to business operator terminal 11 and the plurality of terminals 32. Although the following will describe the processing as being performed in business operator terminal 11, the same processing as that performed in business operator terminal 11 is performed in the plurality of terminals 32 as well.

Next, business operator terminal 11 receives the record transaction data, and based on the record information included in the received record transaction data, calculates a usage fee for the service for the usage amount indicated by the record information (S310).

Next, business operator terminal 11 generates fee transaction data including the calculated usage fee (S311).

Next, business operator terminal 11 forwards the generated fee transaction data to the plurality of terminals 32 (S312). Note that when terminal 32 forwards the transaction data, the transaction data is forwarded to business operator terminal 11 and the other terminals 32.

Next, business operator terminal 11 and the plurality of terminals 32 execute the consensus algorithm, generate a block including the record transaction data and a block including the fee transaction data, and store the blocks in distributed ledgers 118 and 327 (S313).

Next, one of business operator terminal 11 or the plurality of terminals 32 transmits, to terminal A, a request for payment of the usage fee calculated in step S310 (S314).

Next, terminal A makes a payment by displaying a display (UI) prompting user A to pay the usage fee and accepting an input for payment from user A (S315).

Next, business operator terminal 11 determines whether or not the confirmation timing has arrived (S316).

If it is determined that the confirmation timing has arrived (Yes in S316), business operator terminal 11 determines whether or not the first record information is permitted under the rule in the contract content of the contract entered into by the business operator and the first user (S317). Note that the sequence returns to step S316 if business operator terminal 11 determines that the confirmation timing has not arrived (No in S316).

Next, business operator terminal 11 generates the determination transaction data, which includes a result of the determination as to whether or not the first record information is permitted under a rule in the contract content of the contract entered into by the business operator and the first user (S318).

Next, business operator terminal 11 forwards the generated determination transaction data to the plurality of terminals 32 (S319).

Next, business operator terminal 11 and the plurality of terminals 32 execute the consensus algorithm, generate a block including the determination transaction data, and store the block in distributed ledgers 118 and 327 (S320).

Next, business operator terminal 11 determines whether or not the result of determining whether or not the first record information is permitted under a rule in the contract content of the contract entered into by the business operator and the first user is negative (S321).

If it is determined that the result of the determination is negative (Yes in S321), business operator terminal 11 notifies terminal A of user A (i.e., terminal 32a) of the negative determination result (S322).

Once step S322 ends, or if it is determined that the determination result is positive (No in S321), business operator terminal 11 ends the auditing processing.

Effects, Etc.

As described above, even when a single generating device 21 measures usage records of a service by a plurality of users individually for each of the users, the management system and the like according to Embodiment 3 not only can determine whether or not the first record information pertaining to the usage record by the user of the service provided by the business operator is permitted under the rule based on the contract, but also can store the determination transaction data including that determination result in a distributed ledger.

This makes it possible to audit whether the usage record by the user of the service provided by the business operator is permitted under the rule based on the contract, which makes it possible to suppress situations where the business operator and the user collude on a contract. Additionally, the determination result is stored in the distributed ledger, and thus the determination result can be prevented from being tampered with at a later date. Accordingly, situations where the business operator and the user collude on a contract can be suppressed more reliably.

Variation 1

The foregoing Embodiment 3 describes a case where one of business operator terminal 11 and the plurality of terminals 32, such as terminal A or the like, determines whether or not the first record information is permitted under the rule in the contract content of the contract entered into by the business operator and the first user, but the configuration is not limited thereto. An agent server may determine whether or not the first record information is permitted under a rule in the contract content of the contract entered into by the business operator and the first user.

The present variation will describe a case where an agent server determines whether or not the first record information is permitted under a rule in the contract content of the contract entered into by the business operator and the first user. Furthermore, the present variation will describe a case where the agent server, the plurality of terminals 32, and business operator terminal 11 have a distributed ledger constituted by a plurality of ledgers having the same content. The following descriptions will focus upon the differences from Embodiment 2 and the like.

Management System

Figure 23:
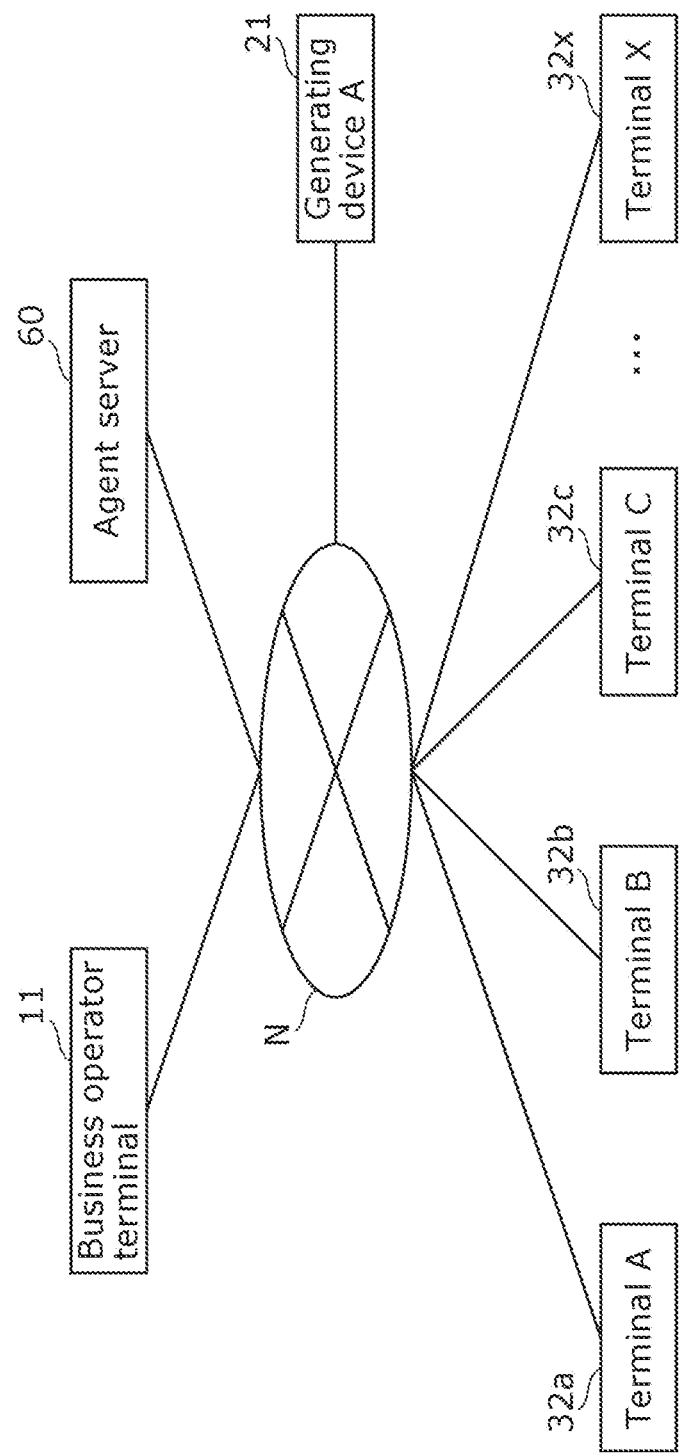
FIG. 23 is a diagram illustrating an example of the configuration of a management system according to Variation 1 on Embodiment 3.

FIG. 23 is a diagram illustrating an example of the configuration of a management system according to Variation 1 on Embodiment 3. Elements identical to those in FIG. 18 are given the same reference signs and will not be described in detail.

The management system illustrated in FIG. 23 differs from the management system according to Embodiment 3 in that agent server 60 is further included. Note that although each of terminal 32a to terminal 32x will also be called "terminal 32" hereinafter as well, terminal 32a to terminal 32x may also be referred to as "terminal A" to "terminal X".

Agent server 60 will be described hereinafter.

Agent Server 60

Agent server 60 is an example of a first server.

Figure 24:
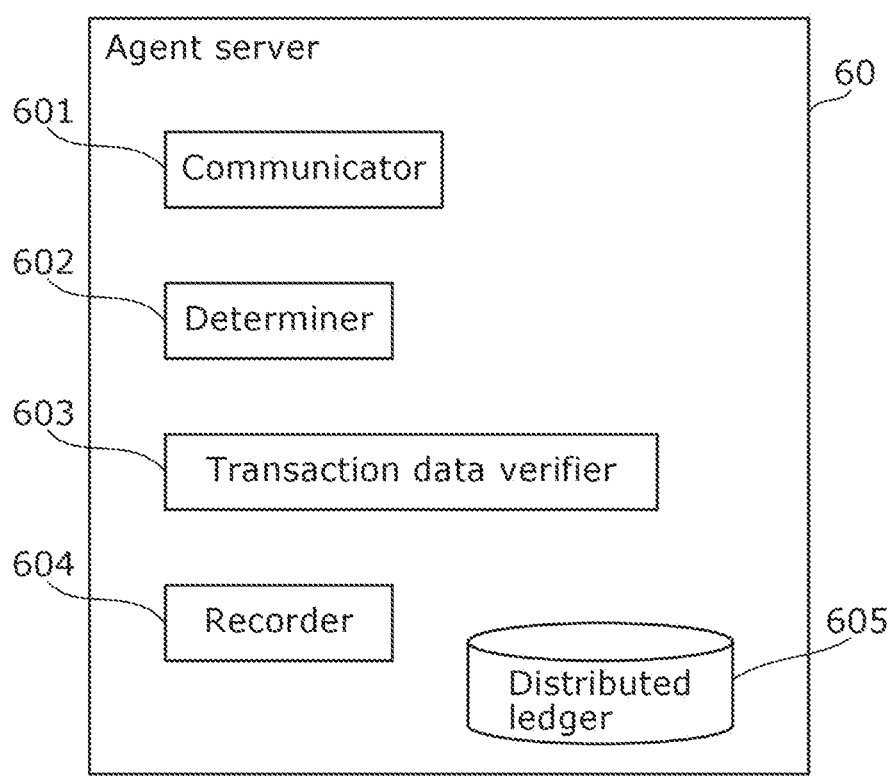
FIG. 24 is a diagram illustrating an example of the configuration of an agent server according to Variation 1 on Embodiment 3.

FIG. 24 is a diagram illustrating an example of the configuration of agent server 60 according to Variation 1 on Embodiment 3.

As illustrated in FIG. 24, agent server 60 includes communicator 601, determiner 602, transaction data verifier 603, recorder 604, and distributed ledger 605. Agent server 60 can be implemented by a processor executing a predetermined program using memory. Each constituent element will be described hereinafter.

Communicator 601

Communicator 601 receives the contract transaction data, including the contract information, from business operator terminal 11. Communicator 601 obtains the contract information by receiving the contract transaction data from business operator terminal 11. Communicator 601 may receive the contract information directly from business operator terminal 11.

Additionally, communicator 601 receives the record transaction data, including the first record information, from generating device 21. Communicator 601 obtains the first record information by receiving the record transaction data from generating device 21. Communicator 601 may receive the first record information directly from generating device 21.

Additionally, communicator 601 may transmit the contract information and the record information of the first user to terminal 32b of the second user. In this case, communicator 601 receives the confirmation transaction data, including the confirmation information of the confirmation result, from terminal 32b of the second user. Communicator 601 obtains the confirmation information by receiving the confirmation transaction data from terminal 32b. Communicator 601 may receive the confirmation information directly from terminal 32b.

Additionally, communicator 601 transmits, to business operator terminal 11 or terminal 32a of the first user, a result indicating whether or not the first record information is permitted under a rule in the contract content of the contract entered into by the business operator and the first user (an audit result). The audit result includes information indicating that the first record information is permitted under a rule in the contract content of the contract entered into by the business operator and the first user, or that the first record information is not permitted under a rule in the contract content of the contract entered into by the business operator and the first user.

Additionally, communicator 601 exchanges each type of transaction data with business operator terminal 11 and the plurality of terminals 32. Specifically, communicator 601 forwards each type of transaction data to business operator terminal 11 and the plurality of terminals 32, receives each type of transaction data from business operator terminal 11 and the plurality of terminals 32, and the like. Note that "each type of transaction data" includes one of the contract transaction data, the record transaction data, determination transaction data, and the confirmation transaction data.

In this manner, communicator 601 communicates with business operator terminal 11, generating device 21, or the plurality of terminals 32 over network N. Note that this communication may be performed using Transport Layer Security (TLS), and communicator 601 may hold an encryption key for TLS communication.

Determiner 602

Determiner 602 determines whether or not the first record information is permitted under a rule in the contract content of the contract entered into by the business operator and the first user. Under the rule in the contract content, the first record information is not permitted to exceed a threshold included in the contract content. In other words, this rule sets an upper limit on the usage amount of the service used by a user in the first period, for example. Note that the first record information includes the usage amount of the service by the user, or a record value that increases as usage time of the service increases. For example, when the service provided by the business operator is a moving body sharing service, this record value is the amount of use of the moving body by the user. The amount of use of the moving body is at least one of, for example, a travel distance of the moving body, a travel time, fuel consumption, or a consumed power amount.

Determiner 602 determines whether or not a confirmation timing has arrived, and if the confirmation timing has arrived, determines whether or not the first record information is permitted. Specifically, the confirmation timing may be a predetermined timing, such as a timing when a usage fee for the service is charged to the user, a timing written in the contract document, or the like. Additionally, the confirmation timing may be the timing at which the usage amount of the service used exceeds a predetermined usage amount after the previous confirmation timing was determined to have arrived. The predetermined usage amount may be greater than the usage amount of the service by the first user in the first period.

Additionally, the confirmation timing may be determined to have arrived when a second period has elapsed after the previous confirmation timing was determined to have arrived. The second period may be longer than the first period, or may be the same as the first period. If the first period and the second period are the same, determiner 602 may determine that the confirmation timing has arrived by obtaining the first record information from generating device 21. The second period may be, for example, 12 hours, one day, one week, one month, or the like. Determiner 602 notifies communicator 601 that the confirmation timing has arrived. Note that the confirmation timing is an example of a first timing.

If it is determined that the first record information is not permitted under the rule in the contract content of the contract entered into by the business operator and the first user, i.e., if the result of this determination indicates that the first record information is not permitted under this rule, determiner 602 may transmit the contract content and the first record information to terminal 32b of the second user, who is different from the first user and who belongs to the same group as the first user. Specifically, if it is determined that the first record information is not permitted under the rule in the contract content of the contract entered into by the business operator and the first user, determiner 602 transmits, to terminal 32b of user B, the contract content of the first user and the usage amount of the service by the first user in the first period. Through this, the user B can perform an audit based on the contract content of user A and the first record information using terminal 32b.

Determiner 602 generates the determination transaction data, which includes a result of the determination as to whether or not the first record information is permitted under a rule in the contract content of the contract entered into by the business operator and the first user. Determiner 602 forwards the generated determination transaction data to communicator 601.

Transaction Data Verifier 603

When communicator 601 receives transaction data, transaction data verifier 603 verifies the validity of the transaction data. For example, transaction data verifier 603 verifies whether the transaction data received by communicator 601 has been given a digital signature generated by a correct method. Note that this verification may be skipped. Here, the transaction data received by communicator 601 is one of the contract transaction data, the record transaction data, the determination transaction data, or the confirmation transaction data.

Additionally, transaction data verifier 603, along with business operator terminal 11 and the plurality of terminals 32, executes a consensus algorithm for agreeing on the validity of the transaction data.

Here, Practical Byzantine Fault Tolerance (PBFT) may be used as the consensus algorithm, or another publicly-known consensus algorithm may be used. For example, Proof of Work (PoW), Proof of Stake (PoS), or the like can be given as publicly-known consensus algorithms. When PBFT is used as the consensus algorithm, transaction data verifier 603 receives reports from business operator terminal 11 and the plurality of terminals 32 indicating whether or not the verification of the transaction data has succeeded, and determines whether or not the number of the reports exceeds a predetermined number. When the number of the reports exceeds the predetermined number, transaction data verifier 603 may determine that the validity of the transaction data has been verified by the consensus algorithm.

When the validity of the transaction data has been verified, transaction data verifier 603 causes recorder 604 to record that transaction data.

In the present embodiment, transaction data verifier 603 verifies the validity of the contract transaction data, the record transaction data, the determination transaction data, and the confirmation transaction data received by communicator 601.

Recorder 604

By including the transaction data for which the validity has been verified by transaction data verifier 603 in blocks and recording the blocks into distributed ledger 605, recorder 604 records the transaction data.

Note that distributed ledger 605 may be configured within recorder 604.

Distributed Ledger 605

Distributed ledger 605 stores the contract transaction data including the contract information, the record transaction data including the record information, the determination transaction data including the determination result, and the confirmation transaction data including the confirmation information.

Operations, Etc. Of Management System

Operations of the management system configured as described above will be described next.

Figure 25:
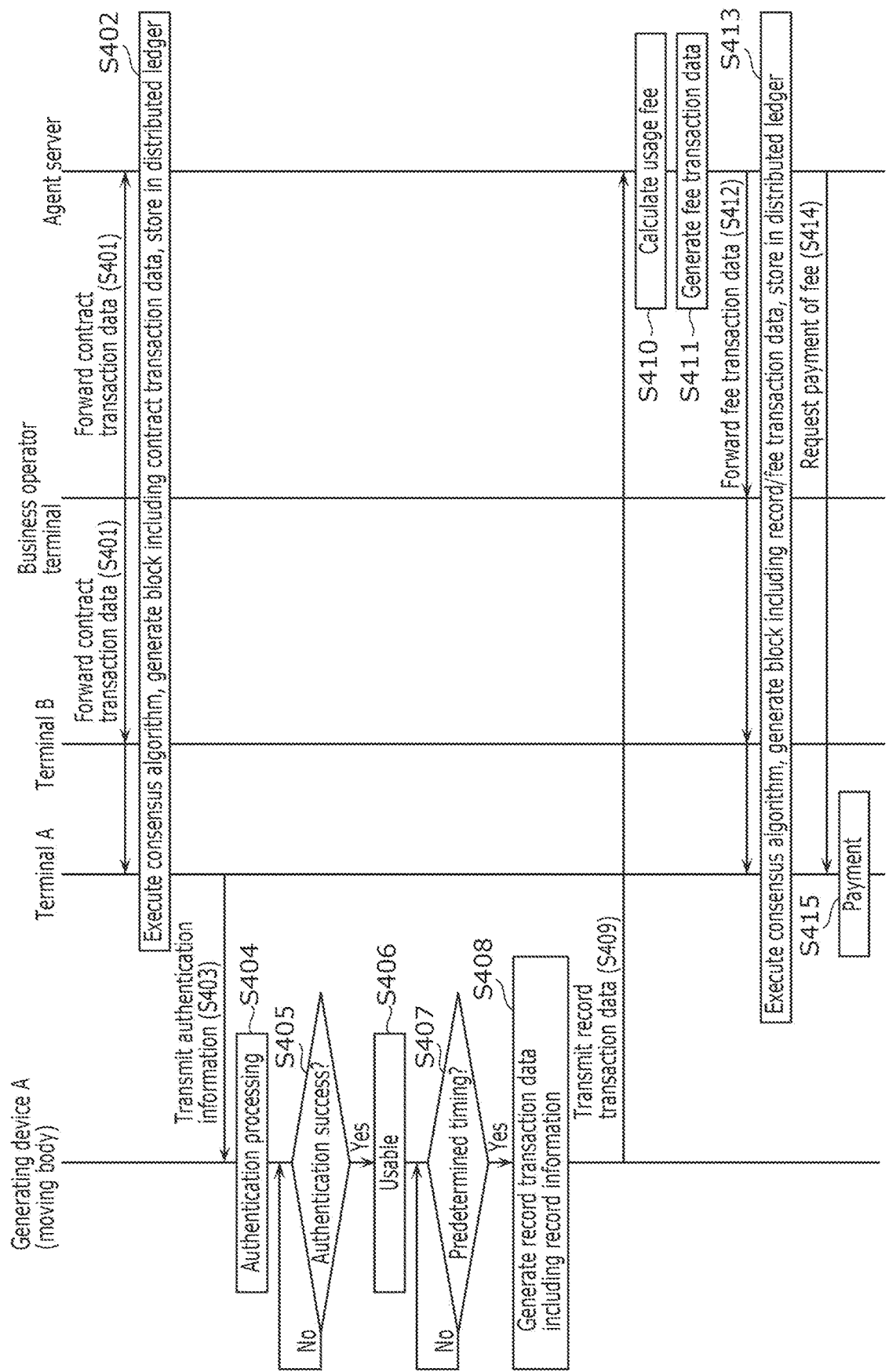
FIG. 25 is a sequence chart illustrating auditing processing by the management system according to Variation 1 on Embodiment 3.
Figure 26:
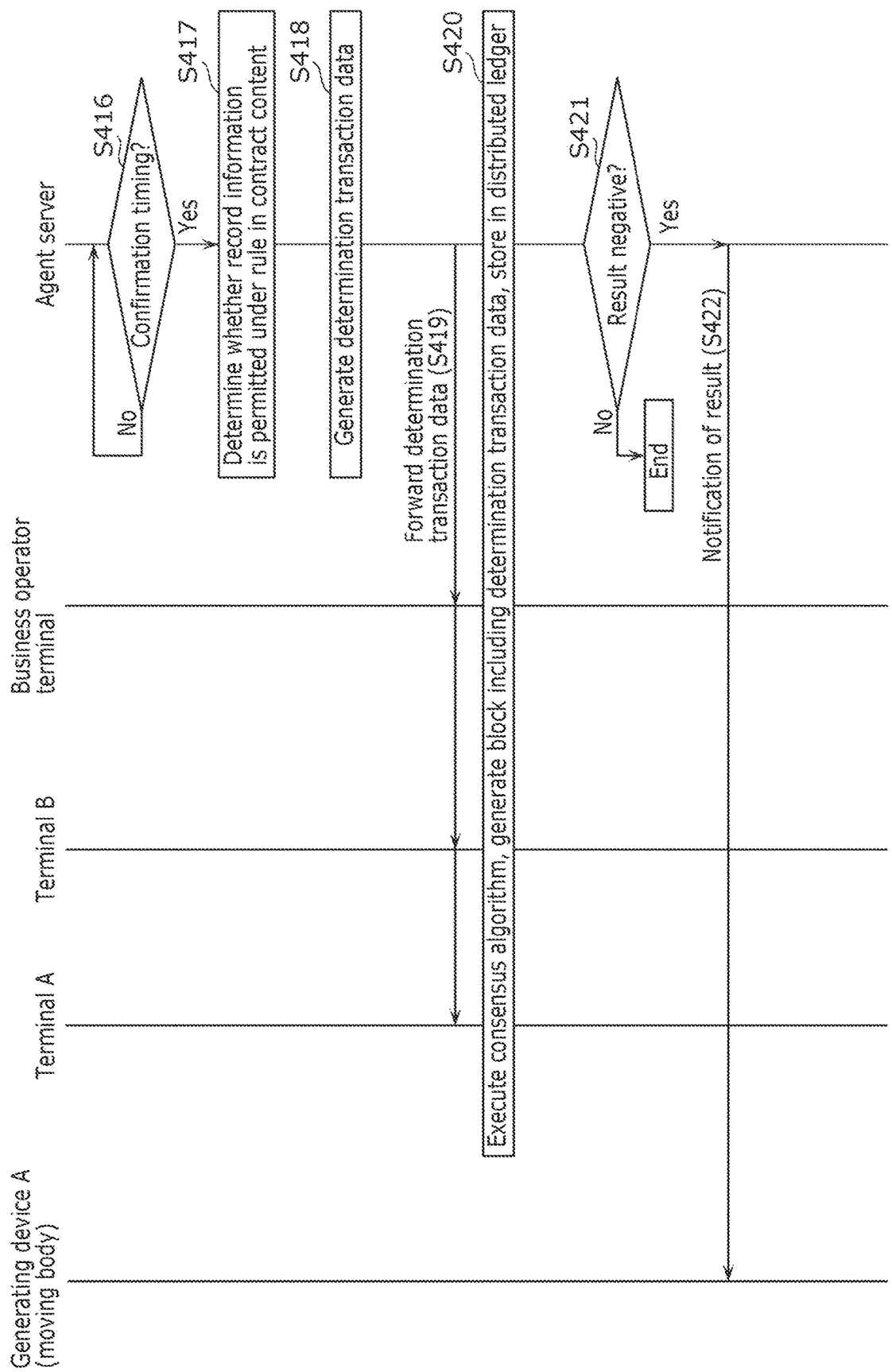
FIG. 26 is a sequence chart illustrating auditing processing by the management system according to Variation 1 on Embodiment 3.

FIGS. 25 and 26 are sequence charts illustrating auditing processing by the management system according to Variation 1 on Embodiment 3. FIG. 26 illustrates the continuation of the processing illustrated in FIG. 25.

First, assume that the business operator using business operator terminal 11 has agreed to a contract with user A. Business operator terminal 11 forwards the contract transaction data, including the contract information indicating this contract, to the plurality of terminals 32 and agent server 60 (S401). Note that the business operator enters into contracts with other user B and user C and transmits the contract transaction data including the contract information indicating the contracts to the plurality of terminals 32 and agent server 60 in the same manner. Note also that business operator terminal 11 may broadcast the contract transaction data including the contract information to the plurality of terminals 32 and agent server 60.

Next, business operator terminal 11, the plurality of terminals 32, and agent server 60 execute the consensus algorithm, generate a block including the contract transaction data, and store the block in distributed ledgers 118, 327, and 605 (S402).

Next, terminal A transmits the authentication information to generating device 21 of the moving body in response to an operation for the authentication, performed by user A using the moving body, being accepted by terminal A (S403).

Generating device 21 receives the authentication information from terminal A and performs authentication processing for authenticating whether or not user A using terminal A is a user permitted to use the moving body including generating device 21 based on the received authentication information (S404).

Next, if the authentication succeeds (Yes in S405), i.e., if it is determined based on the received authentication information that user A using terminal A is a user permitted to use the moving body including generating device 21, generating device 21 shifts the moving body to a usable state (S406). If the authentication fails (No in S405), generating device 21 keeps the moving body in an unusable state, and returns to step S405. Note that generating device 21 may shift the moving body to the usable state in response to a door for entering a cabin of the moving body being unlocked, or may shift the moving body to the usable state in response to a switch for driving the moving body being turned on. Conversely, generating device 21 may put the moving body in the unusable state in response to a door for entering a cabin of the moving body being locked, or may put the moving body in the unusable state in response to a switch for driving the moving body being turned off.

Next, generating device 21 determines whether or not the predetermined timing has arrived (S407).

Next, when it is determined that the predetermined timing has arrived, generating device 21 generates the first record information based on the measured usage amount of the service, and generates the record transaction data including the generated first record information (S408). The first record information may include user information for specifying the user authenticated in step S404. Note that generating device 21 may determine that the predetermined timing has arrived when generating device 21 receives the end information indicating that user A using terminal A stops using the moving body.

Next, generating device 21 transmits the generated record transaction data to business operator terminal 11, the plurality of terminals 32, and agent server 60 (S409). Note that generating device 21 may broadcast the record transaction data including the record information to business operator terminal 11, the plurality of terminals 32, and agent server 60.

Here, although not illustrated in FIG. 25, generating device 21 performs the processing of steps S404 to S409 in response to the authentication information being received from a terminal aside from terminal A (e.g., terminal B), in the same manner as when the authentication information is received from terminal A. Accordingly, the record transaction data including the record information pertaining to the usage amount of the service used by users A to C is transmitted to agent server 60.

Next, agent server 60 receives the record transaction data, and based on the record information included in the received record transaction data, calculates a usage fee for the service for the usage amount indicated by the record information (S410).

Next, agent server 60 generates fee transaction data including the calculated usage fee (S411).

Next, agent server 60 forwards the generated fee transaction data to business operator terminal 11 and the plurality of terminals 32 (S412).

Next, business operator terminal 11, the plurality of terminals 32, and agent server 60 execute the consensus algorithm, generate a block including the record transaction data and a block including the fee transaction data, and store the blocks in distributed ledgers 118, 327, and 605 (S413).

Next, agent server 60 transmits, to terminal A, a request for payment of the usage fee calculated in step S410 (S414).

Next, terminal A makes a payment by displaying a display (UI) prompting user A to pay the usage fee and accepting an input for payment from user A (S415).

Next, agent server 60 determines whether or not the confirmation timing has arrived (S416).

If it is determined that the confirmation timing has arrived (Yes in S416), agent server 60 determines whether or not the first record information is permitted under the rule in the contract content of the contract entered into by the business operator and the first user (S417). Note that the sequence returns to step S416 if agent server 60 determines that the confirmation timing has not arrived (No in S416).

Next, agent server 60 generates the determination transaction data, which includes a result of the determination as to whether or not the first record information is permitted under a rule in the contract content of the contract entered into by the business operator and the first user (S418).

Next, agent server 60 forwards the generated determination transaction data to business operator terminal 11 and the plurality of terminals 32 (S419).

Next, business operator terminal 11, the plurality of terminals 32, and agent server 60 execute the consensus algorithm, generate a block including the determination transaction data, and store the block in distributed ledgers 118 and 327 (S420).

Next, agent server 60 determines whether or not the result of determining whether or not the first record information is permitted under a rule in the contract content of the contract entered into by the business operator and the first user is negative (S421).

If it is determined that the result of the determination is negative (Yes in S421), agent server 60 notifies terminal A of user A (i.e., terminal 32a) of the negative determination result (S422).

Once step S422 ends, or if it is determined that the determination result is positive (No in S421), agent server 60 ends the auditing processing.

Variation 2

The foregoing Variation 1 on Embodiment 3 describes a case where the agent server, the plurality of terminals 32, and business operator terminal 11 have a distributed ledger constituted by a plurality of ledgers having the same content, but the configuration is not limited thereto. The agent server and a plurality of authentication servers may have a distributed ledger constituted by a plurality of ledgers having the same content, and the plurality of terminals 32 and business operator terminal 11 may not have such a distributed ledger.

The present variation will describe a case where the agent server and the plurality of authentication servers have a distributed ledger constituted by a plurality of ledgers having the same content. Furthermore, the present variation will describe a case where the agent server specifies an existing contractor to audit the contract document of a newly-formed contract, and verifies whether or not the specified existing contractor consents to the contract document. The following descriptions will focus upon the differences from Variation 1 and the like.

Management System

Figure 27:
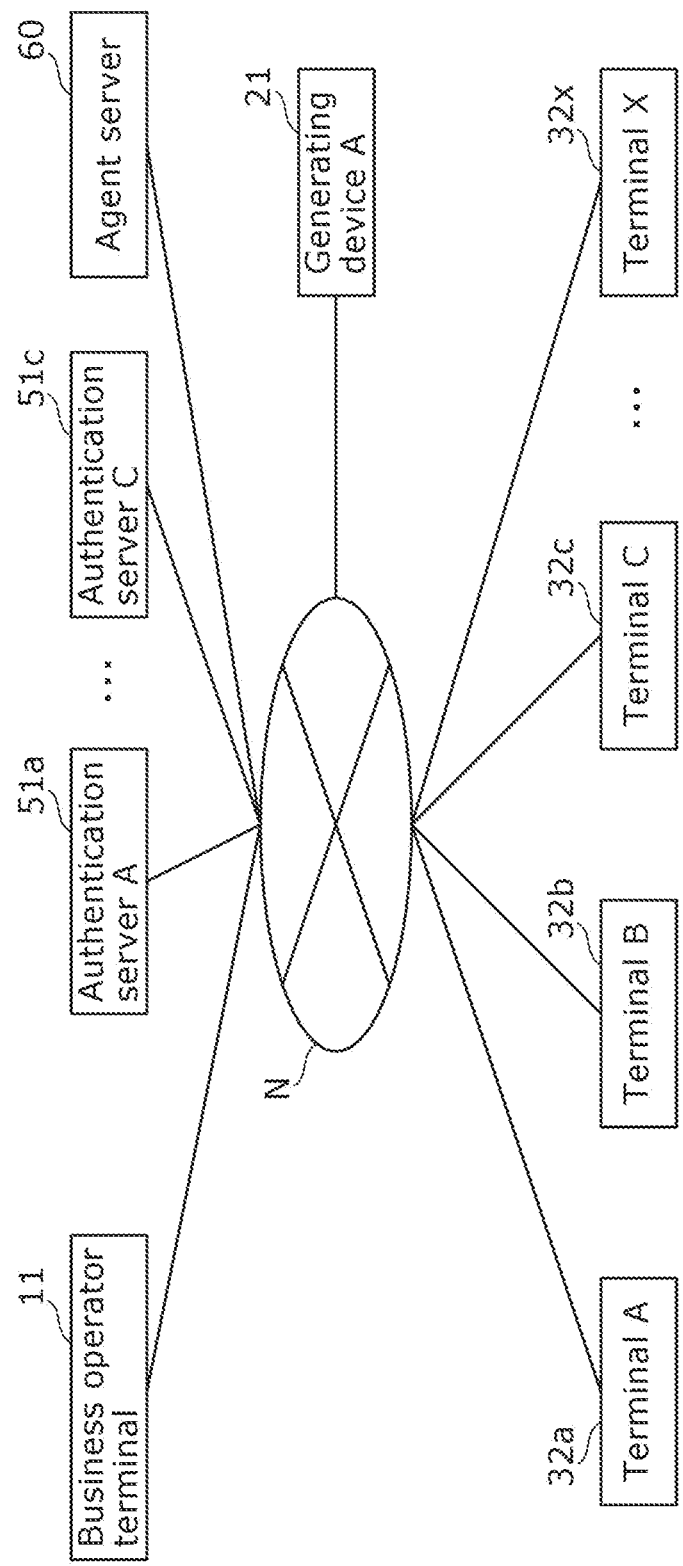
FIG. 27 is a diagram illustrating an example of the configuration of a management system according to Variation 2 on Embodiment 3.

FIG. 27 is a diagram illustrating an example of the configuration of a management system according to Variation 2 on Embodiment 3. Elements identical to those in FIGS. 18 and 23 are given the same reference signs and will not be described in detail.

The management system illustrated in FIG. 27 differs from the management system illustrated in FIG. 18 in that agent server 60 and authentication server 51a to authentication server 51c are further included. Note that agent server 60 illustrated in FIG. 27 is the same as that described in Variation 1 on Embodiment 3, and will therefore not be described here. Additionally, although each of terminal 32a to terminal 32x will also be called "terminal 32" hereinafter as well, terminal 32a to terminal 32x may also be referred to as "terminal A" to "terminal X". Likewise, although each of authentication server 51a to authentication server 51c will also be called "authentication server 51" hereinafter as well, authentication servers 51a to 51c may also be referred to as "authentication server A" to "authentication server C".

Authentication Server 51

Here, authentication server 51a to authentication server 51c have the same configuration, and will therefore be referred to as "authentication server Si".

Authentication server 51 is an example of a first server.

Figure 28:
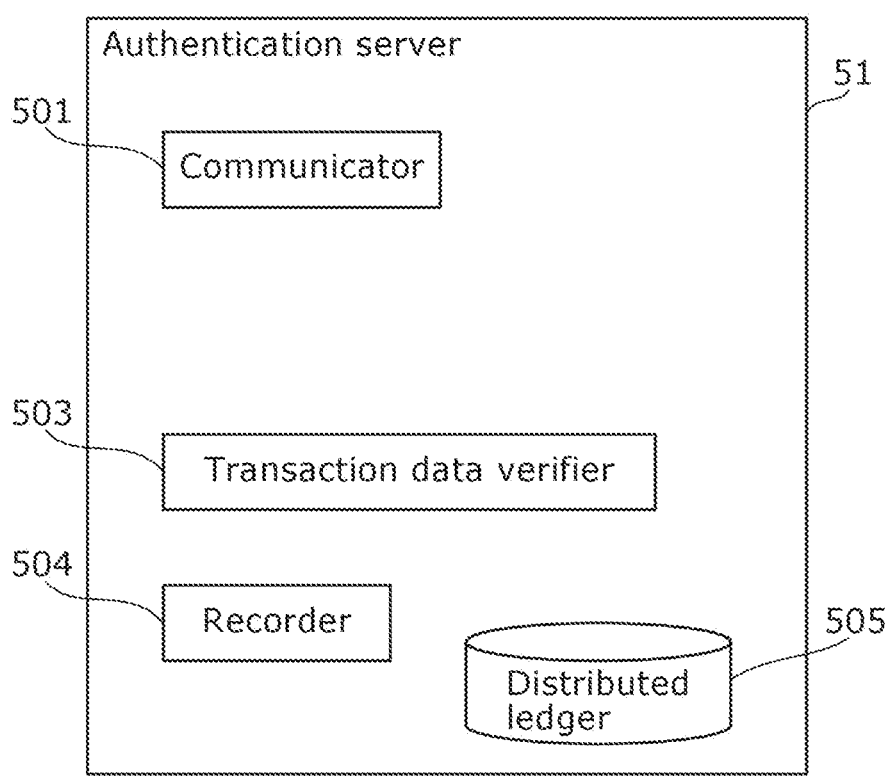
FIG. 28 is a diagram illustrating an example of the configuration of an authentication server according to Variation 2 on Embodiment 3.

FIG. 28 is a diagram illustrating an example of the configuration of authentication server 51 according to Variation 2 on Embodiment 3. Elements identical to those in FIG. 5 are given the same reference signs and will not be described in detail.

Authentication server 51 illustrated in FIG. 28 differs from authentication server 50 illustrated in FIG. 5 in that determiner 502 is not included. Authentication server 51, too, can be implemented by a processor executing a predetermined program using memory.

Operations, Etc. Of Management System

Operations of the management system configured as described above will be described next.

Figure 29:
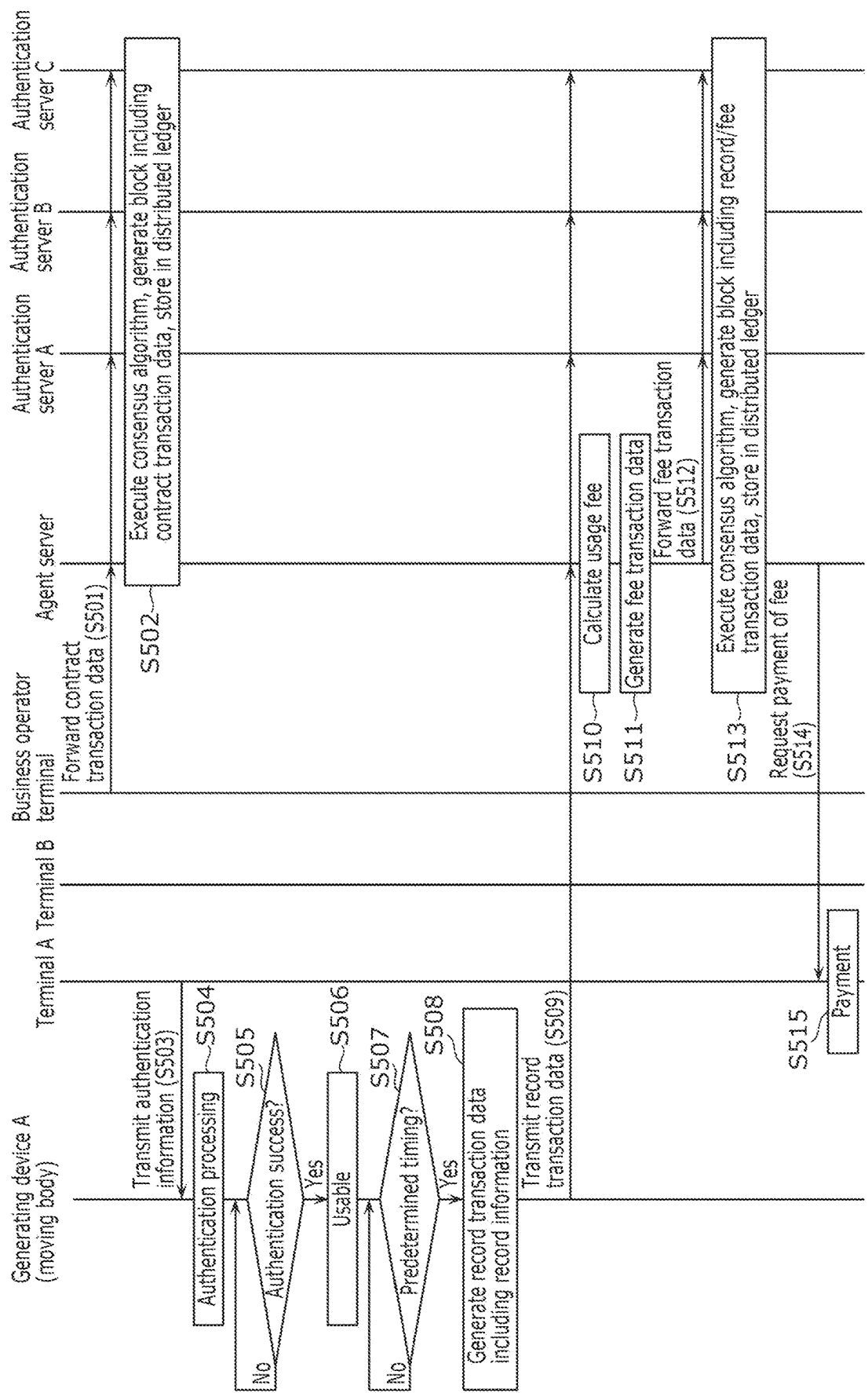
FIG. 29 is a sequence chart illustrating auditing processing by the management system according to Variation 2 on Embodiment 3.

FIGS. 29 and 30 are sequence charts illustrating auditing processing by the management system according to Variation 2 on Embodiment 3. FIG. 30 illustrates the continuation of the processing illustrated in FIG. 29.

First, assume that the business operator using business operator terminal 11 has agreed to a contract with user A. Business operator terminal 11 forwards the contract transaction data, including the contract information indicating this contract, to the plurality of authentication servers 51 and agent server 60 (S501). Note that the business operator enters into contracts with other user B and user C and transmits the contract transaction data including the contract information indicating the contracts to the plurality of authentication servers 51 and agent server 60 in the same manner. Note also that business operator terminal 11 may broadcast the contract transaction data including the contract information to the plurality of authentication servers 51 and agent server 60.

Next, the plurality of authentication servers 51 and agent server 60 execute the consensus algorithm, generate a block including the contract transaction data, and store the block in distributed ledgers 505 and 605 (S502).

Next, terminal A transmits the authentication information to generating device 21 of the moving body in response to an operation for the authentication, performed by user A using the moving body, being accepted by terminal A (S503).

Generating device 21 receives the authentication information from terminal A and performs authentication processing for authenticating whether or not user A using terminal A is a user permitted to use the moving body including generating device 21 based on the received authentication information (S504).

Next, if the authentication succeeds (Yes in S505), i.e., if it is determined based on the received authentication information that user A using terminal A is a user permitted to use the moving body including generating device 21, generating device 21 shifts the moving body to a usable state (S506). If the authentication fails (No in S505), generating device 21 keeps the moving body in an unusable state, and returns to step S505. Note that generating device 21 may shift the moving body to the usable state in response to a door for entering a cabin of the moving body being unlocked, or may shift the moving body to the usable state in response to a switch for driving the moving body being turned on. Conversely, generating device 21 may put the moving body in the unusable state in response to a door for entering a cabin of the moving body being locked, or may put the moving body in the unusable state in response to a switch for driving the moving body being turned off.

Next, generating device 21 determines whether or not the predetermined timing has arrived (S507).

Next, when it is determined that the predetermined timing has arrived, generating device 21 generates the first record information based on the measured usage amount of the service, and generates the record transaction data including the generated first record information (S508). The first record information may include user information for specifying the user authenticated in step S504. Note that generating device 21 may determine that the predetermined timing has arrived when generating device 21 receives the end information indicating that user A using terminal A stops using the moving body.

Next, generating device 21 transmits the generated record transaction data to the plurality of authentication servers 51 and agent server 60 (S509). Note that generating device 21 may broadcast the record transaction data including the record information to the plurality of authentication servers 51 and agent server 60.

Here, although not illustrated in FIG. 29, generating device 21 performs the processing of steps S504 to S509 in response to the authentication information being received from a terminal aside from terminal A (e.g., terminal B), in the same manner as when the authentication information is received from terminal A. Accordingly, the record transaction data including the record information pertaining to the usage amount of the service used by users A to C is transmitted to agent server 60.

Next, agent server 60 receives the record transaction data, and based on the record information included in the received record transaction data, calculates a usage fee for the service for the usage amount indicated by the record information (S510).

Next, agent server 60 generates fee transaction data including the calculated usage fee (S511).

Next, agent server 60 forwards the generated fee transaction data to the plurality of authentication servers 51 (S512).

Next, the plurality of authentication servers 51 and agent server 60 execute the consensus algorithm, generate a block including the record transaction data and a block including the fee transaction data, and store the blocks in distributed ledgers 505 and 605 (S513).

Next, agent server 60 transmits, to terminal A, a request for payment of the usage fee calculated in step S510 (S514).

Next, terminal A makes a payment by displaying a display (UI) prompting user A to pay the usage fee and accepting an input for payment from user A (S515).

Next, agent server 60 determines whether or not the confirmation timing has arrived (S516).

If it is determined that the confirmation timing has arrived (Yes in S516), agent server 60 determines whether or not the first record information is permitted under the rule in the contract content of the contract entered into by the business operator and the first user (S517). Note that the sequence returns to step S516 if agent server 60 determines that the confirmation timing has not arrived (No in S516).

Next, agent server 60 generates the determination transaction data, which includes a result of the determination as to whether or not the first record information is permitted under a rule in the contract content of the contract entered into by the business operator and the first user (S518).

Next, agent server 60 forwards the generated determination transaction data to the plurality of authentication servers 51 (S519).

Next, the plurality of authentication servers 51 and agent server 60 execute the consensus algorithm, generate a block including the determination transaction data, and store the block in distributed ledgers 505 and 506 (S520).

Next, agent server 60 determines whether or not the result of determining whether or not the first record information is permitted under a rule in the contract content of the contract entered into by the business operator and the first user is negative (S521).

If it is determined that the result of the determination is negative (Yes in S521), agent server 60 notifies terminal A of user A (i.e., terminal 32a) of the negative determination result (S522).

Once step S522 ends, or if it is determined that the determination result is positive (No in S521), agent server 60 ends the auditing processing.

OTHER EMBODIMENTS

Although the present disclosure has been described above based on the aforementioned embodiments, the present disclosure is of course not limited to the embodiments discussed above. The present disclosure is also inclusive of the following cases.

(1) The foregoing embodiments described the authentication servers, the agent server, and the like as determining whether or not the first record information is permitted under the rule in the contract content of the contract entered into by the business operator and the first user. However, the disclosure is not limited thereto. The authentication servers, the agent server, and the like may further be equipped with artificial intelligence (AI). In this case, the authentication servers, the agent server, and the like may cause the AI to determine whether or not the first record information is permitted under a rule in the contract content of the contract entered into by the business operator and the first user.

(2) Each device in the foregoing embodiments is specifically a computer system constituted by a microprocessor, ROM, RAM, a hard disk unit, a display unit, a keyboard, a mouse, and the like. A computer program is recorded in the RAM or hard disk unit. Each device realizes the functions thereof by the microprocessor operating in accordance with the computer program. Here, the computer program is constituted by a combination of a plurality of command codes that indicate commands made to a computer to achieve a predetermined function.

(3) Some or all of the constituent elements constituting the devices in the foregoing embodiments may be implemented by a single integrated circuit through system LSI (Large-Scale Integration). "System LSI" refers to very-large-scale integration in which multiple constituent elements are integrated on a single chip, and specifically, refers to a computer system configured including a microprocessor, ROM, RAM, and the like. A computer program is recorded in the RAM. The system LSI circuit realizes the functions thereof by the microprocessor operating in accordance with the computer program.

The parts of the constituent elements constituting the foregoing devices may be implemented individually as single chips, or may be implemented with a single chip including some or all of the devices.

Although the term "system LSI" is used here, other names, such as IC, LSI, super LSI, ultra LSI, and so on may be used, depending on the level of integration. Furthermore, the manner in which the circuit integration is achieved is not limited to LSI, and it is also possible to use a dedicated circuit or a generic processor. An FPGA (Field Programmable Gate Array) capable of post-production programming or a reconfigurable processor in which the connections and settings of the circuit cells within the LSI can be reconfigured may be used as well.

Furthermore, if other technologies that improve upon or are derived from semiconductor technology enable integration technology to replace LSI circuits, then naturally it is also possible to integrate the function blocks using that technology. Biotechnology applications are one such foreseeable example.

(4) Some or all of the constituent elements constituting the foregoing devices may be constituted by IC cards or stand-alone modules that can be removed from and mounted in the apparatus. The IC card or the module is a computer system constituted by a microprocessor, ROM, RAM, and the like. The IC card or module may include the above very-large-scale integration LSI circuit. The IC card or module realizes the functions thereof by the microprocessor operating in accordance with the computer program. The IC card or module may be tamper-resistant.

(5) The present disclosure may be realized by the methods described above. This may be a computer program that implements these methods on a computer, or a digital signal constituting the computer program.

Additionally, the present disclosure may also be computer programs or digital signals recorded in a computer-readable recording medium such as a flexible disk, a hard disk, a CD-ROM, an MO, a DVD, a DVD-ROM, a DVD-RAM, a BD (Blu-ray (registered trademark) Disc), semiconductor memory, or the like. The constituent elements may also be the digital signals recorded in such a recording medium.

Additionally, the present disclosure may be realized by transmitting the computer program or digital signal via a telecommunication line, a wireless or wired communication line, a network such as the Internet, a data broadcast, or the like.

The present disclosure may also be a computer system including a microprocessor and memory, where the memory stores the above-described computer program and the microprocessor operates in accordance with the computer program.

The present disclosure may also be implemented by another independent computer system, by recording the program or the digital signal in the recording medium and transferring the recording medium, or by transferring the program or the digital signal over the network or the like.

(6) The above-described embodiments and variations may be combined as well.

INDUSTRIAL APPLICABILITY

The present disclosure can be used in a control method, a server, and a program, and when, for example, a business operator and a user enter into an individual contract for a vehicle sharing service or the like, the present disclosure can be used in a control method, a server, a program, and the like capable of determining whether or not record information is permitted under a rule in the contract content of a contract entered into by the business operator and a first user.

The invention claimed is:

1. A control method for a system including a plurality of servers and a vehicle that generates record information pertaining to a usage record for each of users belonging to one group when a service provided by a business operator is used on a group basis, the control method comprising:
    performing authentication processing for determining whether or not a first user belonging to the one group is permitted to use the vehicle based on authentication information received from a terminal of the first user;
    when the authentication processing determines the first user is permitted to use vehicle, shifting the vehicle from an unusable state to a usable state in response to a door for entering a cabin of the vehicle being unlocked;
    obtaining, from the vehicle at a predetermined timing after the vehicle has been shifted to the usable state, first record information pertaining to a first usage record of the vehicle by the first user, the first record information being at least one of an amount of use of the vehicle by the first user, a travel time of the vehicle by the first user, fuel consumption of the vehicle by the first user, and a consumed power amount of the vehicle by the first user;
    determining whether or not the first record information obtained exceeds an upper limit set by a rule in contract content of a contract entered into by the first user and the business operator, the contract content being stored in a first server among the plurality of servers;
    forwarding first transaction data including a determination result from the determining to a plurality of second servers different from the first server and storing a first block including the first transaction data in a distributed ledger managed by the first server;
    transmitting the contract content and the first record information to a terminal of a second user different from the first user and the business operator and belonging to the one group when the determination result indicates that the first record information is not permitted under the rule;
    obtaining, from the terminal of the second user, a confirmation result by the second user regarding the contract content and the first record information; and
    forwarding the confirmation result obtained to the plurality of second servers and storing a second block including the confirmation result in the distributed ledger,
    wherein the second user is determined from among a plurality of users belonging to the one group at random or by referring to a predetermined table.

2. The control method according to claim 1, further comprising:
    forwarding the first record information obtained to the plurality of second servers and storing a third block including the first record information in the distributed ledger.

3. The control method according to claim 1, further comprising:
    when storing the first block in the distributed ledger,
        executing, along with the plurality of second servers, a consensus algorithm for agreeing on a validity of transaction data including the first transaction data; and
        storing a block including the transaction data in the distributed ledger when the validity of the transaction data has been agreed on through the consensus algorithm.

4. The control method according to claim 3, further comprising:
    when storing a block including the transaction data in the distributed ledger,
    storing the transaction data in the distributed ledger as blockchain transaction data.

5. The control method according to claim 1,
    wherein the system further includes a plurality of terminals each used by a corresponding one of the users,
    each of the plurality of terminals has the distributed ledger, and
    the control method further comprises, when storing a block including the first transaction data in the distributed ledger:
        executing, along with the plurality of terminals, a consensus algorithm for agreeing on a validity of transaction data including the first transaction data; and
        storing a block including the transaction data in the distributed ledger when the validity of the transaction data has been agreed on through the consensus algorithm.

6. A system including a plurality of servers and a vehicle that generates record information pertaining to a usage record for each of users belonging to one group when a service provided by a business operator is used on a group basis, the system comprising:
    a processor; and
    memory,
    wherein the processor:
        performing authentication processing for determining whether or not a first user belonging to the one group is permitted to use the vehicle based on authentication information received from a terminal of the first user;
        when the authentication processing determines the first user is permitted to use vehicle, shifting the vehicle from an unusable state to a usable state in response to a door for entering a cabin of the vehicle being unlocked;
        obtains, from the vehicle at a predetermined timing after the vehicle has been shifted to the usable state, first record information pertaining to a first usage record of the vehicle by the first user, the first record information being at least one of an amount of use of the vehicle by the first user, a travel time of the vehicle by the first user, fuel consumption of the vehicle by the first user, and a consumed power amount of the vehicle by the first user;
        determines whether or not the first record information obtained exceeds an upper limit set by a rule in contract content of a contract entered into by the first user and the business operator, the contract content being stored in a first server among the plurality of servers;

forwards first transaction data including a determination result from the determining to a plurality of other servers different from the first server and stores a first block including the first transaction data in a distributed ledger managed by the first server;

transmits the contract content and the first record information to a terminal of a second user different from the first user and the business operator and belonging to the one group when the determination result indicates that the first record information is not permitted under the rule;

obtains, from the terminal of the second user, a confirmation result by the second user regarding the contract content and the first record information; and forwards the confirmation result obtained to the plurality of second servers and storing a second block including the confirmation result in the distributed ledger, and wherein the second user is determined from among a plurality of users belonging to the one group at random or by referring to a predetermined table.

7. A non-transitory computer-readable recording medium storing a program for causing a computer to execute a control method for a system including a plurality of servers and a vehicle that generates record information pertaining to a usage record for each of users belonging to one group when a service provided by a business operator is used on a group basis, the control method comprising:

performing authentication processing for determining whether or not a first user belonging to the one group is permitted to use the vehicle based on authentication information received from a terminal of the first user;

when the authentication processing determines the first user is permitted to use vehicle, shifting the vehicle from an unusable state to a usable state in response to a door for entering a cabin of the vehicle being unlocked;

obtaining, from the vehicle at a predetermined timing after the vehicle has been shifted to the usable state, first record information pertaining to a first usage record of the vehicle by the first user, the first record information being at least one of an amount of use of the vehicle by the first user, a travel time of the vehicle by the first user, fuel consumption of the vehicle by the first user, and a consumed power amount of the vehicle by the first user;

determining whether or not the first record information obtained exceeds an upper limit set by a rule in contract content of a contract entered into by the first user and the business operator, the contract content being stored in a first server among the plurality of servers;

forwarding first transaction data including a determination result from the determining to a plurality of second servers different from the first server and storing a first block including the first transaction data in a distributed ledger managed by the first server;

transmitting the contract content and the first record information to a terminal of a second user different from the first user and the business operator and belonging to the one group when the determination result indicates that the first record information is not permitted under the rule;

obtaining, from the terminal, a confirmation result by the second user regarding the contract content and the first record information; and forwarding the confirmation result obtained to the plurality of second servers and storing a second block including the confirmation result in the distributed ledger, and wherein the second user is determined from among a plurality of users belonging to the one group at random or by referring to a predetermined table.

\* \* \* \* \*